US012600382B2

(12) United States Patent
Hayes et al.

(10) Patent No.: US 12,600,382 B2
(45) Date of Patent: Apr. 14, 2026

(54) PROCESS SCHEDULING BASED ON DATA ARRIVAL IN AN AUTONOMOUS VEHICLE

(71) Applicant: Applied Intuition, Inc., Mountain View, CA (US)

(72) Inventors: John Hayes, Mountain View, CA (US); Volkmar Uhlig, Cupertino, CA (US)

(73) Assignee: Applied Intuition, Inc., Sunnyvale, CA (US)

( * ) Notice: Subject to any disclaimer, the term of this patent is extended or adjusted under 35 U.S.C. 154(b) by 406 days.

(21) Appl. No.: 17/714,314

(22) Filed: Apr. 6, 2022

(65) Prior Publication Data

US 2023/0322264 A1 Oct. 12, 2023

(51) Int. Cl.
*B60W 60/00* (2020.01)
*B60W 50/02* (2012.01)
*B60W 50/08* (2020.01)

(52) U.S. Cl.
CPC ........ *B60W 60/0018* (2020.02); *B60W 50/02* (2013.01); *B60W 50/082* (2013.01); *B60W 2420/403* (2013.01)

(58) Field of Classification Search
CPC ........ H04L 12/40071; B60W 60/0018; B60W 50/02; B60W 50/082; B60W 2420/403; B60W 50/00; B60W 2050/0006; G06F 9/3836; G06F 9/4806; G06F 9/5038; G06F 9/5066; G06V 20/50
See application file for complete search history.

(56) References Cited

U.S. PATENT DOCUMENTS

| | | | | |
|---|---|---|---|---|
| 10,306,430 B1 * | 5/2019 | Abari | ................... | G05D 1/0055 |
| 10,310,509 B1 * | 6/2019 | Ferguson | ............. | B60W 10/18 |
| 10,694,150 B2 * | 6/2020 | Ihlenburg | ............ | H04N 13/128 |
| 11,107,230 B2 * | 8/2021 | Pillai | ...................... | G06V 10/82 |
| 11,351,939 B2 * | 6/2022 | Gourari | ................ | H04L 12/437 |
| 11,388,241 B1 * | 7/2022 | Myers, Jr. | .............. | H04W 4/44 |
| 11,681,725 B2 * | 6/2023 | Shemer | .................. | G06F 16/38 |
| | | | | 707/600 |

(Continued)

FOREIGN PATENT DOCUMENTS

| | | | | |
|---|---|---|---|---|
| DE | 102013220506 A1 * | 4/2015 | ............ | H04N 7/181 |
| EP | 2293588 A1 * | 3/2011 | .......... | H04N 23/811 |

(Continued)

OTHER PUBLICATIONS

WO-2018173909-A1 machine translation (Year: 2018).*

(Continued)

*Primary Examiner* — Fadey S. Jabr
*Assistant Examiner* — Mark Robert Heim
(74) *Attorney, Agent, or Firm* — McDermott Will & Schulte LLP

(57) ABSTRACT

Process scheduling based on data arrival in an autonomous vehicle, including: receiving, by a node and from one or more other nodes of a distributed automation computing system, a plurality of portions of data; generating a process schedule by scheduling, for each portion of data of the plurality of portions of data, a process for processing a corresponding portion of data within a time window, wherein an ordering of the process schedule corresponds to an order of arrival of the plurality of portions of data; and executing, during the time window, the process schedule.

20 Claims, 13 Drawing Sheets

(56) References Cited

U.S. PATENT DOCUMENTS

| | | | | |
|---|---|---|---|---|
| 11,797,022 | B1 * | 10/2023 | Ballantyne | G06T 7/13 |
| 11,805,236 | B2 * | 10/2023 | Watson | A63F 13/67 |
| 11,854,279 | B2 * | 12/2023 | Takahashi | G06V 20/64 |
| 11,880,293 | B1 * | 1/2024 | Hendrix | G06F 11/362 |
| 12,254,249 | B1 * | 3/2025 | Cahoon | G07C 5/12 |
| 12,351,168 | B2 * | 7/2025 | Jang | B60W 60/0011 |
| 2002/0193920 | A1 * | 12/2002 | Miller | G06Q 50/40 |
| | | | | 701/9 |
| 2005/0113988 | A1 * | 5/2005 | Nasr | B60L 15/06 |
| | | | | 701/2 |
| 2015/0092988 | A1 * | 4/2015 | Mitoma | G01C 3/085 |
| | | | | 382/104 |
| 2018/0009444 | A1 * | 1/2018 | Grimm | B60W 50/04 |
| 2019/0322288 | A1 * | 10/2019 | Hansel | G05D 1/0217 |
| 2020/0023854 | A1 * | 1/2020 | Horiguchi | B60W 10/18 |
| 2020/0209861 | A1 * | 7/2020 | Priyadarshi | G05B 17/02 |
| 2020/0210225 | A1 * | 7/2020 | Priyadarshi | G05D 1/0248 |
| 2020/0210234 | A1 * | 7/2020 | Priyadarshi | G06F 9/3818 |
| 2020/0225669 | A1 * | 7/2020 | Silva | G01S 17/06 |
| 2021/0011908 | A1 * | 1/2021 | Hayes | G06N 20/00 |
| 2021/0034412 | A1 * | 2/2021 | Televitckiy | G05D 1/0088 |
| 2021/0078611 | A1 * | 3/2021 | Hayes | G06F 18/24317 |
| 2021/0163021 | A1 * | 6/2021 | Frazzoli | B60W 50/023 |
| 2021/0232829 | A1 * | 7/2021 | Mori | G06V 20/56 |
| 2021/0309167 | A1 * | 10/2021 | Gourari | G06V 20/56 |
| 2021/0370986 | A1 * | 12/2021 | Heyl | G06V 20/56 |
| 2021/0387670 | A1 * | 12/2021 | Furuta | B60W 40/00 |
| 2022/0012503 | A1 * | 1/2022 | Peppoloni | G06V 20/56 |
| 2022/0116479 | A1 * | 4/2022 | Liu | H04L 47/50 |
| 2022/0126875 | A1 * | 4/2022 | Hammoud | B60W 30/09 |
| 2022/0148204 | A1 * | 5/2022 | Guizilini | G06T 7/55 |
| 2022/0188663 | A1 * | 6/2022 | Appel | G06N 5/04 |
| 2022/0198842 | A1 * | 6/2022 | Agarwal | G07C 5/0808 |
| 2022/0229759 | A1 * | 7/2022 | Wang | G06F 11/3688 |
| 2022/0283851 | A1 * | 9/2022 | Lee | G06F 9/541 |
| 2022/0301206 | A1 * | 9/2022 | Guizilini | G06V 20/58 |
| 2022/0340151 | A1 * | 10/2022 | Farag | B60W 50/0205 |
| 2022/0397673 | A1 * | 12/2022 | Wang | G06V 20/64 |
| 2023/0064755 | A1 * | 3/2023 | Shi | G06F 11/3409 |
| 2023/0086053 | A1 * | 3/2023 | Azuma | B60W 10/18 |
| | | | | 701/41 |
| 2023/0091924 | A1 * | 3/2023 | Dowdall | G01S 17/42 |
| | | | | 701/26 |
| 2023/0093511 | A1 * | 3/2023 | Wang | G06F 11/3024 |
| | | | | 718/104 |
| 2023/0150484 | A1 * | 5/2023 | Zink | B60W 30/08 |
| | | | | 701/301 |
| 2023/0281861 | A1 * | 9/2023 | Liu | G06T 5/50 |
| | | | | 382/103 |
| 2023/0286539 | A1 * | 9/2023 | Malloch | G06N 3/096 |
| 2023/0316769 | A1 * | 10/2023 | Hashimoto | B60W 50/10 |
| | | | | 348/148 |
| 2023/0322241 | A1 * | 10/2023 | Hayes | B60W 50/0205 |
| 2023/0326265 | A1 * | 10/2023 | Law | G07C 5/008 |
| | | | | 701/33.4 |
| 2025/0044983 | A1 * | 2/2025 | Sood | G07C 5/08 |

FOREIGN PATENT DOCUMENTS

| | | | | | |
|---|---|---|---|---|---|
| EP | 3246780 | A1 * | 11/2017 | | B64D 43/02 |
| EP | 3629261 | A1 * | 4/2020 | | |
| KR | 20150011620 | A * | 2/2015 | | B60W 30/16 |
| WO | WO-2018173909 | A1 * | 9/2018 | | B60W 10/18 |
| WO | WO-2020138908 | A1 * | 7/2020 | | G06N 3/045 |
| WO | WO-2022082230 | A2 * | 4/2022 | | G08G 1/0112 |
| WO | WO-2022218510 | A1 * | 10/2022 | | G06F 9/4881 |

OTHER PUBLICATIONS

Li, Optik International Journal, Relative Pose Measurement Based on Binocular Vision (Year: 2019).*

DE-102013220506-A1 machine translation (Year: 2015).*

KR-20150011620-A machine translation (Year: 2015).*

WO-2020138908-A1 machine translation (Year: 2020).*

* cited by examiner

700

PROCESS SCHEDULING BASED ON DATA ARRIVAL IN AN AUTONOMOUS VEHICLE

CROSS-REFERENCE TO RELATED APPLICATION

This application is related to co-pending U.S. patent application Ser. No. 17/714,388, titled, "Implementing Degraded Performance Modes in an Autonomous Vehicle", filed Apr. 6, 2022, which is hereby incorporated by reference in its entirety.

BACKGROUND

Field of the Invention

The field of the invention is autonomous systems, or, more specifically, methods, apparatus, autonomous vehicles, and products for process scheduling based on data arrival in an autonomous vehicle.

Description of Related Art

Autonomous driving systems typically employ hard real-time systems for performing autonomous driving operations. Such systems require that particular operations be performed within particular time windows or by a particular deadline in order to avoid a system failure.

SUMMARY

Process scheduling based on data arrival in an autonomous vehicle may include: receiving, by a node and from one or more other nodes of a distributed automation computing system, a plurality of portions of data; generating a process schedule by scheduling, for each portion of data of the plurality of portions of data, a process for processing a corresponding portion of data within a time window, wherein an ordering of the process schedule corresponds to an order of arrival of the plurality of portions of data; and executing, during the time window, the process schedule.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

The terminology used herein for the purpose of describing particular examples is not intended to be limiting for further examples. Whenever a singular form such as "a", "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises", "comprising", "includes" and/or "including", when used, specify the presence of the stated features, integers, steps, operations, processes, acts, elements and/or components, but do not preclude the presence or addition of one or more other features, integers, steps, operations, processes, acts, elements, components and/or any group thereof. Additionally, when an element is described as "plurality," it is understood to mean two or more of such an element. However, as set forth above, further examples may implement the same functionality using a single element/

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B, as well as A and B. An alternative wording for the same combinations is "at least one of A and B". The same applies for combinations of more than two elements.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

Figure 1:
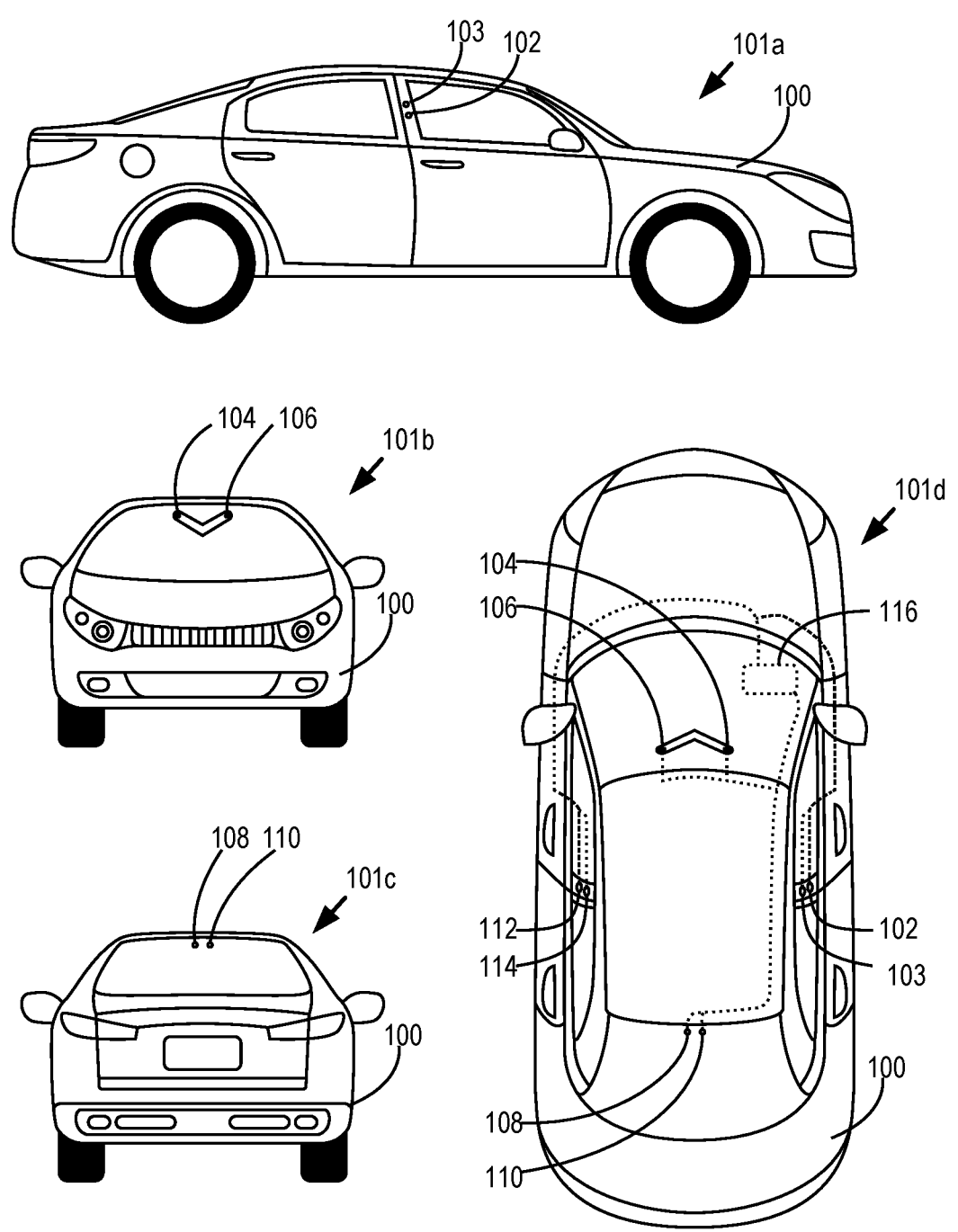
FIG. 1 shows example views of an autonomous vehicle for process scheduling based on data arrival in an autonomous vehicle according to some embodiments of the present disclosure according to some embodiments of the present disclosure.

Process scheduling based on data arrival in an autonomous vehicle may be implemented in an autonomous vehicle. Accordingly, FIG. 1 shows multiple views of an autonomous vehicle 100 configured for process scheduling based on data arrival in an autonomous vehicle according to embodiments of the present invention. Right side view 101a shows a right side of the autonomous vehicle 100. Shown in the right side view 101a are cameras 102 and 103, configured to capture image data, video data, and/or audio data of the environmental state of the autonomous vehicle 100 from the perspective of the right side of the car. Front view 101b shows a front side of the autonomous vehicle 100. Shown in the front view 101b are cameras 104 and 106, configured to capture image data, video data, and/or audio data of the environmental state of the autonomous vehicle 100 from the perspective of the front of the car. Rear view 101c shows a rear side of the autonomous vehicle 100. Shown in the rear view 101c are cameras 108 and 110, configured to capture image data, video data, and/or audio data of the environmental state of the autonomous vehicle 100 from the perspective of the rear of the car. Top view 101d shows a rear side of the autonomous vehicle 100. Shown in the top view 101d are cameras 102-110. Also shown are cameras 112 and 114, configured to capture image data, video data, and/or audio data of the environmental state of the autonomous vehicle 100 from the perspective of the left side of the car.

Further shown in the top view 101d is an automation computing system 116. The automation computing system 116 comprises one or more computing devices configured to control one or more autonomous operations (e.g., autonomous driving operations) of the autonomous vehicle 100. For example, the automation computing system 116 may be configured to process sensor data (e.g., data from the cameras 102-114 and potentially other sensors), operational data (e.g., a speed, acceleration, gear, orientation, turning direction), and other data to determine a operational state and/or operational history of the autonomous vehicle. The automation computing system 116 may then determine one or more operational commands for the autonomous vehicle (e.g., a change in speed or acceleration, a change in brake application, a change in gear, a change in turning or orientation, etc.). The automation computing system 116 may also capture and store sensor data. Operational data of the autonomous vehicle may also be stored in association with corresponding sensor data, thereby indicating the operational data of the autonomous vehicle 100 at the time the sensor data was captured.

Although the autonomous vehicle 100 if FIG. 1 is shown as car, it is understood that autonomous vehicles 100 configured for process scheduling based on data arrival in an autonomous vehicle may also include other vehicles, including motorcycles, planes, helicopters, unmanned aerial vehicles (UAVs, e.g., drones), or other vehicles as can be appreciated. Moreover, it is understood that additional cameras or other external sensors may also be included in the autonomous vehicle 100.

Process scheduling based on data arrival in an autonomous vehicle in accordance with the present invention is generally implemented with computers, that is, with automated computing machinery. For further explanation, therefore, FIG. 2 sets forth a block diagram of automated computing machinery comprising an exemplary automation computing system 116 configured for process scheduling based on data arrival in an autonomous vehicle according to embodiments of the present invention. The automation computing system 116 of FIG. 2 includes at least one computer Central Processing Unit (CPU) package 204 as well as random access memory 206 ('RAM') which is connected through a high speed memory bus 208 and bus adapter 210 to CPU packages 204 via a front side bus 211 and to other components of the automation computing system 116.

A CPU package 204 may comprise a plurality of processing units. For example, each CPU package 204 may comprise a logical or physical grouping of a plurality of processing units. Each processing unit may be allocated a particular process for execution. Moreover, each CPU package 204 may comprise one or more redundant processing units. A redundant processing unit is a processing unit not allocated a particular process for execution unless a failure occurs in another processing unit. For example, when a given processing unit allocated a particular process fails, a redundant processing unit may be selected and allocated the given process. A process may be allocated to a plurality of processing units within the same CPU package 204 or different CPU packages 204. For example, a given process may be allocated to a primary processing unit in a CPU package 204. The results or output of the given process may be output from the primary processing unit to a receiving process or service. The given process may also be executed in parallel on a secondary processing unit. The secondary processing unit may be included within the same CPU package 204 or a different CPU package 204. The secondary processing unit may not provide its output or results of the process until the primary processing unit fails. The receiving process or service will then receive data from the secondary processing unit. A redundant processing unit may then be selected and have allocated the given process to ensure that two or more processing units are allocated the given process for redundancy and increased reliability.

The CPU packages 204 are communicatively coupled to one or more sensors 212. The sensors 212 are configured to capture sensor data describing the operational and environmental conditions of an autonomous vehicle. For example, the sensors 212 may include cameras (e.g., the cameras 102-114 of FIG. 1), accelerometers, Global Positioning System (GPS) radios, Lidar sensors, or other sensors as can be appreciated. As described herein, cameras may include a stolid state sensor 212 with a solid state shutter capable of measuring photons or a time of flight of photons. For example, a camera may be configured to capture or measure photons captured via the shutter for encoding as images and/or video data. As another example, a camera may emit photons and measure the time of flight of the emitted photons. Cameras may also include event cameras configured to measure changes in light and/or motion of light.

Although the sensors 212 are shown as being external to the automation computing system 116, it is understood that one or more of the sensors 212 may reside as a component of the automation computing system 116 (e.g., on the same board, within the same housing or chassis). The sensors 212 may be communicatively coupled with the CPU packages 204 via a switched fabric 213. The switched fabric 213 comprises a communications topology through which the CPU packages 204 and sensors 212 are coupled via a plurality of switching mechanisms (e.g., latches, switches, crossbar switches, field programmable gate arrays (FPGAs), etc.). For example, the switched fabric 213 may implement a mesh connection connecting the CPU packages 204 and sensors 212 as endpoints, with the switching mechanisms serving as intermediary nodes of the mesh connection. The CPU packages 204 and sensors 212 may be in communication via a plurality of switched fabrics 213. For example, each of the switched fabrics 213 may include the CPU packages 204 and sensors 212, or a subset of the CPU packages 204 and sensors 212, as endpoints. Each switched fabric 213 may also comprise a respective plurality of switching components. The switching components of a given switched fabric 213 may be independent (e.g., not connected) of the switching components of other switched fabrics 213 such that only switched fabric 213 endpoints (e.g., the CPU packages 204 and sensors 212) are overlapping across the switched fabrics 213. This provides redundancy such that, should a connection between a CPU package 204 and sensor 212 fail in one switched fabric 213, the CPU package 204 and sensor 212 may remain connected via another switched fabric 213. Moreover, in the event of a failure in a CPU package 204, a processor of a CPU package 204, or a sensor, a communications path excluding the failed component and including a functional redundant component may be established.

The CPU packages 204 and sensors 212 are configured to receive power from one or more power supplies 215. The power supplies 215 may comprise an extension of a power system of the autonomous vehicle 100 or an independent power source (e.g., a battery). The power supplies 215 may supply power to the CPU packages 204 and sensors 212 by another switched fabric 214. The switched fabric 214 provides redundant power pathways such that, in the event of a failure in a power connection, a new power connection pathway may be established to the CPU packages 204 and sensors 212.

Stored in RAM 206 is an automation module 220. The automation module 220 may be configured to process sensor data from the sensors 212 to determine a driving decision for the autonomous vehicle. The driving decision comprises one or more operational commands for an autonomous vehicle 100 to affect the movement, direction, or other function of the autonomous vehicle 100, thereby facilitating autonomous driving or operation of the vehicle. Such operational commands may include a change in the speed of the autonomous vehicle 100, a change in steering direction, a change in gear, or other command as can be appreciated. For example, the automation module 220 may provide sensor data and/or processed sensor data as one or more inputs to a trained machine learning model (e.g., a trained neural network) to determine the one or more operational commands. The operational commands may then be communicated to autonomous vehicle control systems 223 via a vehicle interface 222.

In some embodiments, the automation module 220 may be configured to determine an exit path for an autonomous vehicle 100 in motion. The exit path includes one or more operational commands that, if executed, are determined and/or predicted to bring the autonomous vehicle 100 safely to a stop (e.g., without collision with an object, without violating one or more safety rules). The automation module

220 may determine a both a driving decision and an exit path at a predefined interval. The automation module 220 may then send the driving decision and the exit path to the autonomous vehicle control systems 223. The autonomous vehicle control systems 223 may be configured to execute the driving decision unless an error state has been reached. If an error decision has been reached, therefore indicating a possible error in functionality of the automation computing system 116), the autonomous vehicle control systems 223 may then execute a last received exit path in order to bring the autonomous vehicle 100 safely to a stop. Thus, the autonomous vehicle control systems 223 are configured to receive both a driving decision and exit path at predefined intervals, and execute the exit path in response to an error.

The autonomous vehicle control systems 223 are configured to affect the movement and operation of the autonomous vehicle 100. For example, the autonomous vehicle control systems 223 may activate (e.g., apply one or more control signals) to actuators or other components to turn or otherwise change the direction of the autonomous vehicle 100, accelerate or decelerate the autonomous vehicle 100, change a gear of the autonomous vehicle 100, or otherwise affect the movement and operation of the autonomous vehicle 100.

Further stored in RAM 206 is a data collection module 224 configured to process and/or store sensor data received from the one or more sensors 212. For example, the data collection module 224 may store the sensor data as captured by the one or more sensors 212, or processed sensor 212 data (e.g., sensor 212 data having object recognition, compression, depth filtering, or other processes applied). Such processing may be performed by the data collection module 224 in real-time or in substantially real-time as the sensor data is captured by the one or more sensors 212. The processed sensor data may then be used by other functions or modules. For example, the automation module 220 may use processed sensor data as input to determine one or more operational commands. The data collection module 224 may store the sensor data in data storage 218.

Also stored in RAM 206 is a data processing module 226. The data processing module 226 is configured to perform one or more processes on stored sensor data (e.g., stored in data storage 218 by the data collection module 218) prior to upload to a execution environment 227. Such operations can include filtering, compression, encoding, decoding, or other operations as can be appreciated. The data processing module 226 may then communicate the processed and stored sensor data to the execution environment 227.

Further stored in RAM 206 is a hypervisor 228. The hypervisor 228 is configured to manage the configuration and execution of one or more virtual machines 229. For example, each virtual machine 229 may emulate and/or simulate the operation of a computer. Accordingly, each virtual machine 229 may comprise a guest operating system 216 for the simulated computer. The hypervisor 228 may manage the creation of a virtual machine 229 including installation of the guest operating system 216. The hypervisor 228 may also manage when execution of a virtual machine 229 begins, is suspended, is resumed, or is terminated. The hypervisor 228 may also control access to computational resources (e.g., processing resources, memory resources, device resources) by each of the virtual machines.

Each of the virtual machines 229 may be configured to execute one or more of the automation module 220, the data collection module 224, the data processing module 226, or combinations thereof. Moreover, as is set forth above, each of the virtual machines 229 may comprise its own guest operating system 216. Guest operating systems 216 useful in autonomous vehicles in accordance with some embodiments of the present disclosure include UNIX™, Linux™, Microsoft Windows™, AIX™, IBM's i OS™, and others as will occur to those of skill in the art. For example, the autonomous vehicle 100 may be configured to execute a first operating system when the autonomous vehicle is in an autonomous (or even partially autonomous) driving mode and the autonomous vehicle 100 may be configured to execute a second operating system when the autonomous vehicle is not in an autonomous (or even partially autonomous) driving mode. In such an example, the first operating system may be formally verified, secure, and operate in real-time such that data collected from the sensors 212 are processed within a predetermined period of time, and autonomous driving operations are performed within a predetermined period of time, such that data is processed and acted upon essentially in real-time. Continuing with this example, the second operating system may not be formally verified, may be less secure, and may not operate in real-time as the tasks that are carried out (which are described in greater detail below) by the second operating system are not as time-sensitive the tasks (e.g., carrying out self-driving operations) performed by the first operating system.

Readers will appreciate that although the example included in the preceding paragraph relates to an embodiment where the autonomous vehicle 100 may be configured to execute a first operating system when the autonomous vehicle is in an autonomous (or even partially autonomous) driving mode and the autonomous vehicle 100 may be configured to execute a second operating system when the autonomous vehicle is not in an autonomous (or even partially autonomous) driving mode, other embodiments are within the scope of the present disclosure. For example, in another embodiment one CPU (or other appropriate entity such as a chip, CPU core, and so on) may be executing the first operating system and a second CPU (or other appropriate entity) may be executing the second operating system, where switching between these two modalities is accomplished through fabric switching, as described in greater detail below. Likewise, in some embodiments, processing resources such as a CPU may be partitioned where a first partition supports the execution of the first operating system and a second partition supports the execution of the second operating system.

The guest operating systems 216 may correspond to a particular operating system modality. An operating system modality is a set of parameters or constraints which a given operating system satisfies, and are not satisfied by operating systems of another modality. For example, a given operating system may be considered a "real-time operating system" in that one or more processes executed by the operating system must be performed according to one or more time constraints. For example, as the automation module 220 must make determinations as to operational commands to facilitate autonomous operation of a vehicle. Accordingly, the automation module 220 must make such determinations within one or more time constraints in order for autonomous operation to be performed in real time. The automation module 220 may then be executed in an operating system (e.g., a guest operating system 216 of a virtual machine 229) corresponding to a "real-time operating system" modality. Conversely, the data processing module 226 may be able to perform its processing of sensor data independent of any time constrains, and may then be executed in an operating system (e.g., a guest operating system 216 of a virtual machine 229) corresponding to a "non-real-time operating system" modality.

As another example, an operating system (e.g., a guest operating system 216 of a virtual machine 229) may comprise a formally verified operating system. A formally verified operating system is an operating system for which the correctness of each function and operation has been verified with respect to a formal specification according to formal proofs. A formally verified operating system and an unverified operating system (e.g., one that has not been formally verified according to these proofs) can be said to operate in different modalities.

Figure 2:
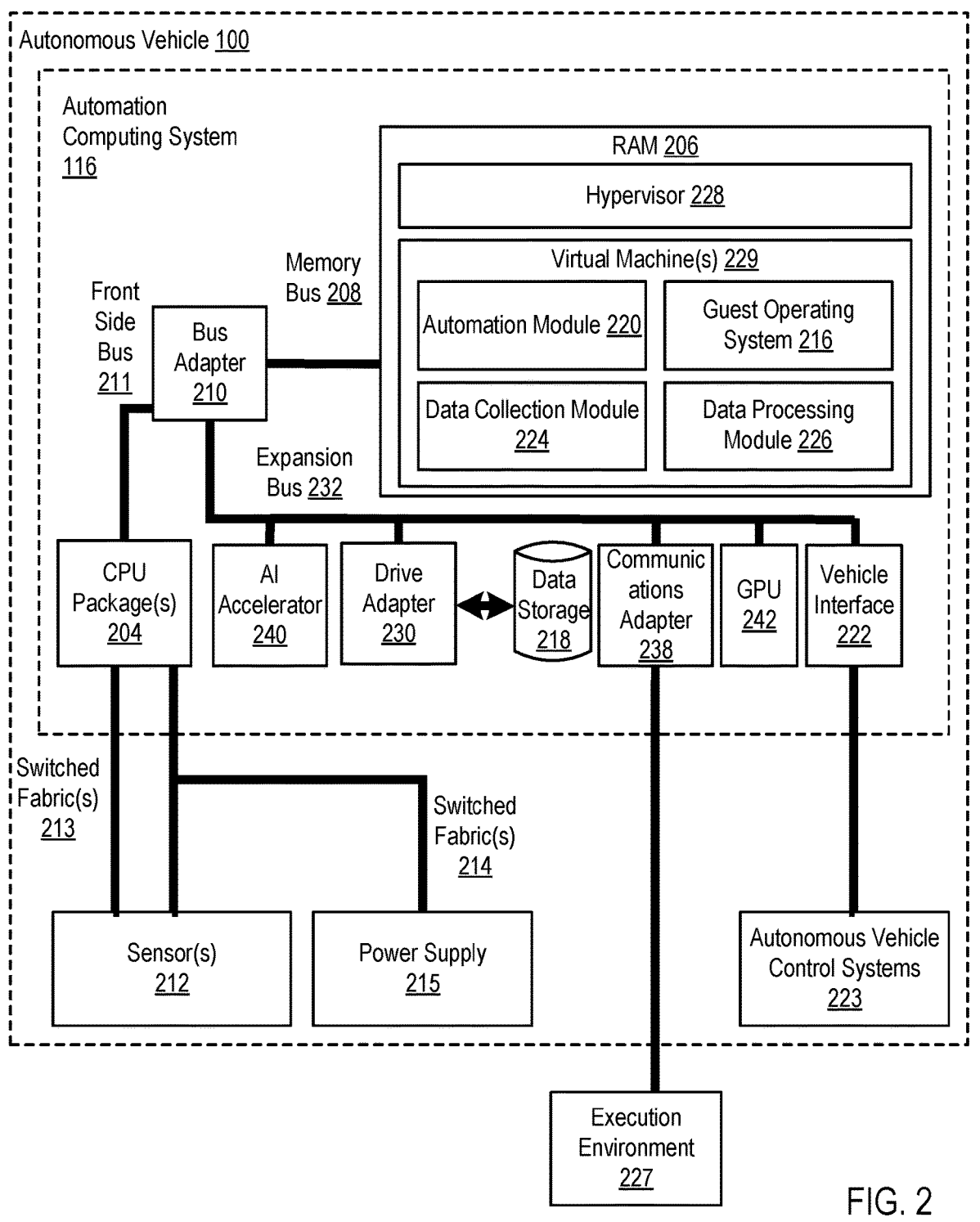
FIG. 2 is a block diagram of an autonomous computing system for process scheduling based on data arrival in an autonomous vehicle according to some embodiments of the present disclosure.

The automation module 220, data collection module 224, data collection module 224, data processing module 226, hypervisor 228, and virtual machine 229 in the example of FIG. 2 are shown in RAM 206, but many components of such software typically are stored in non-volatile memory also, such as, for example, on data storage 218, such as a disk drive. Moreover, any of the automation module 220, data collection module 224, and data processing module 226 may be executed in a virtual machine 229 and facilitated by a guest operating system 216 of that virtual machine 229.

The automation computing system 116 of FIG. 2 includes disk drive adapter 230 coupled through expansion bus 232 and bus adapter 210 to CPU package(s) 204 and other components of the automation computing system 116. Disk drive adapter 230 connects non-volatile data storage to the automation computing system 116 in the form of data storage 218. Disk drive adapters 230 useful in computers configured for process scheduling based on data arrival in an autonomous vehicle according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The exemplary automation computing system 116 of FIG. 2 includes a communications adapter 238 for data communications with other computers and for data communications with a data communications network. Such data communications may be carried out serially through RS-238 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for process scheduling based on data arrival in an autonomous vehicle according to embodiments of the present invention include modems for wired dial-up communications, Ethernet (IEEE 802.3) adapters for wired data communications, 802.11 adapters for wireless data communications, as well as mobile adapters (e.g., cellular communications adapters) for mobile data communications. For example, the automation computing system 116 may communicate with one or more remotely disposed execution environments 227 via the communications adapter 238.

The exemplary automation computing system of FIG. 2 also includes one or more Artificial Intelligence (AI) accelerators 240. The AI accelerator 240 provides hardware-based assistance and acceleration of AI-related functions, including machine learning, computer vision, etc. Accordingly, performance of any of the automation module 220, data collection module 224, data processing module 226, or other operations of the automation computing system 116 may be performed at least in part by the AI accelerators 240.

The exemplary automation computing system of FIG. 2 also includes one or more graphics processing units (GPUs) 242. The GPUs 242 are configured to provide additional processing and memory resources for processing image and/or video data, including encoding, decoding, etc. Accordingly, performance of any of the automation module 220, data collection module 224, data processing module 226, or other operations of the automation computing system 116 may be performed at least in part by the GPUs 242.

Figure 3:
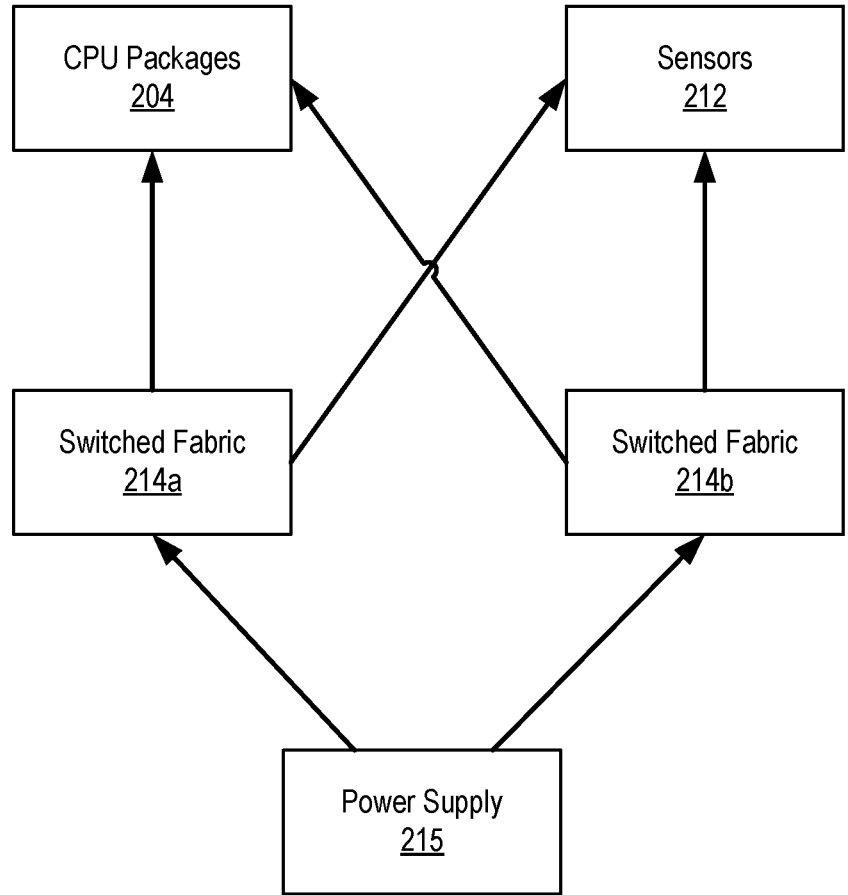
FIG. 3 is a block diagram of a redundant power fabric for process scheduling based on data arrival in an autonomous vehicle according to some embodiments of the present disclosure.

FIG. 3 shows an example redundant power fabric for process scheduling based on data arrival in an autonomous vehicle. The redundant power fabric provides redundant pathways for power transfer between the power supplies 215, the sensors 212, and the CPU packages 204. In this example, the power supplies 215 are coupled to the sensors 212 and CPU packages via two switched fabrics 214a and 214b. The topology shown in FIG. 3 provides redundant pathways between the power supplies 215, the sensors 212, and the CPU packages 204 such that power can be rerouted through any of multiple pathways in the event of a failure in an active connection pathway. The switched fabrics 214a and 214b may provide power to the sensors 212 using various connections, including Mobile Industry Processor Interface (MIPI), Inter-Integrated Circuit (I2C), Universal Serial Bus (USB), or another connection. The switched fabrics 214a and 214b may also provide power to the CPU packages 204 using various connections, including Peripheral Component Interconnect Express (PCIe), USB, or other connections. Although only two switched fabrics 214a and 214b are shown connecting the power supplies 215 to the sensors 212 and CPU packages 204, it is understood that the approach shown by FIG. 3 can be modified to include additional switched fabrics 214.

Figure 4:
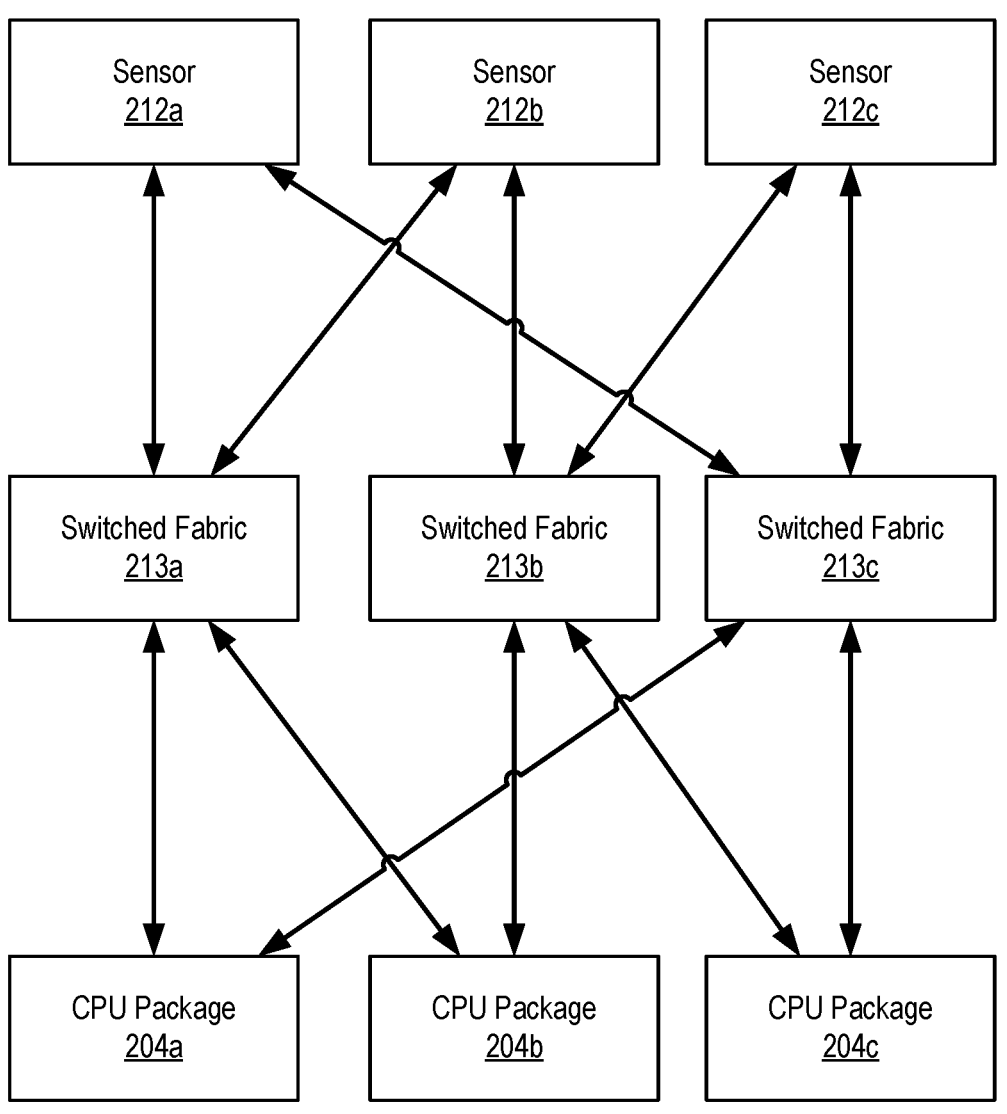
FIG. 4 is a block diagram of a redundant data fabric for process scheduling based on data arrival in an autonomous vehicle according to some embodiments of the present disclosure.

FIG. 4 is an example redundant data fabric for process scheduling based on data arrival in an autonomous vehicle. The redundant data fabric provides redundant data connection pathways between sensors 212 and CPU packages 204. In this example view, three CPU packages 204a, 204b, and 204c are connected to three sensors 212a, 212b, and 212c via three switched fabrics 213a, 213b, and 213c. Each CPU package 204a, 204b, and 204c is connected to a subset of the switched fabrics 213a, 213b, and 213c. For example, CPU package 204a is connected to switched fabrics 213a and 213c, CPU package 204b is connected to switched fabrics 213a and 213b, and CPU package 204c is connected to switched fabrics 213b and 213c. Each switched fabric 213a, 213b, and 213c is connected to a subset of the sensors 212a, 212b, and 212c. For example, switched fabric 213a is connected to sensors 212a and 212b, switched fabric 213b is connected to sensor 212b and 212c, and switched fabric 213c is connected to sensors 212a and 212c. Under this topology, each CPU package 204a, 204b, and 204c has an available connection path to any sensor 212a, 212b, and 212c. It is understood that the topology of FIG. 4 is exemplary, and that CPU packages, switched fabrics, sensors, or connections between components may be added or removed while maintaining redundancy as can be appreciated by one skilled in the art.

Figure 5:
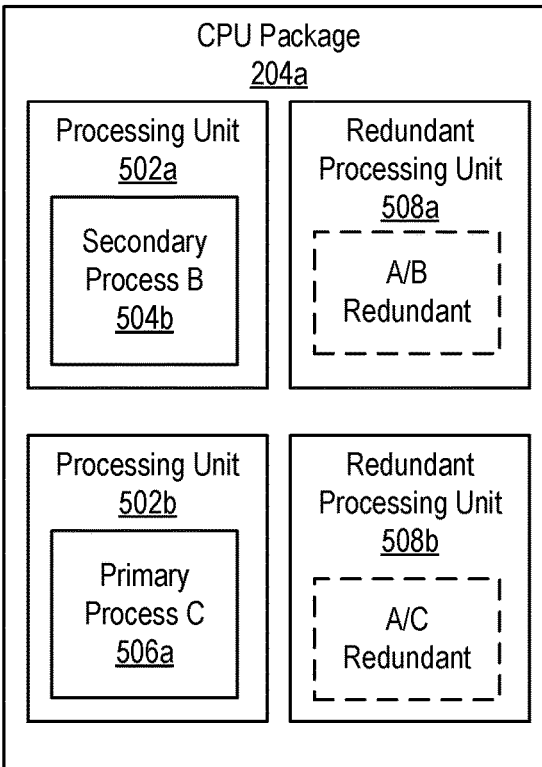
FIG. 5 is an example view of process allocation across CPU packages for process scheduling based on data arrival in an autonomous vehicle according to some embodiments of the present disclosure.
Figure 5:
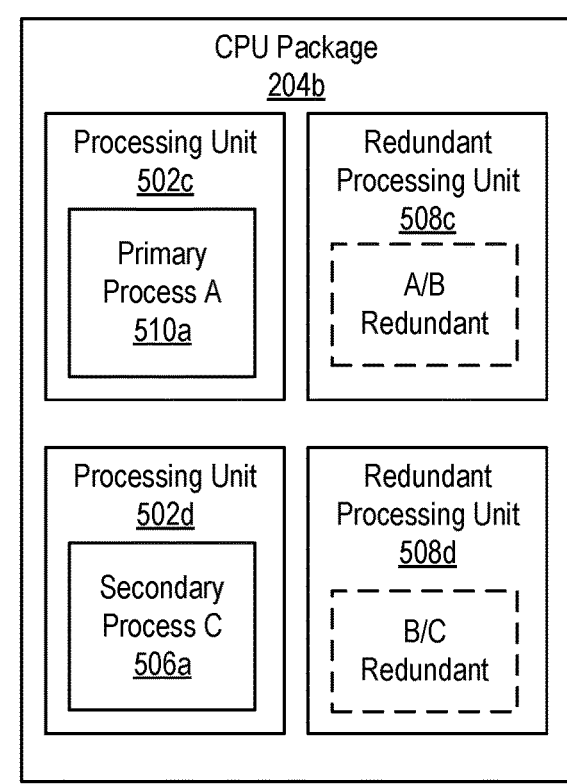
Figure 5:
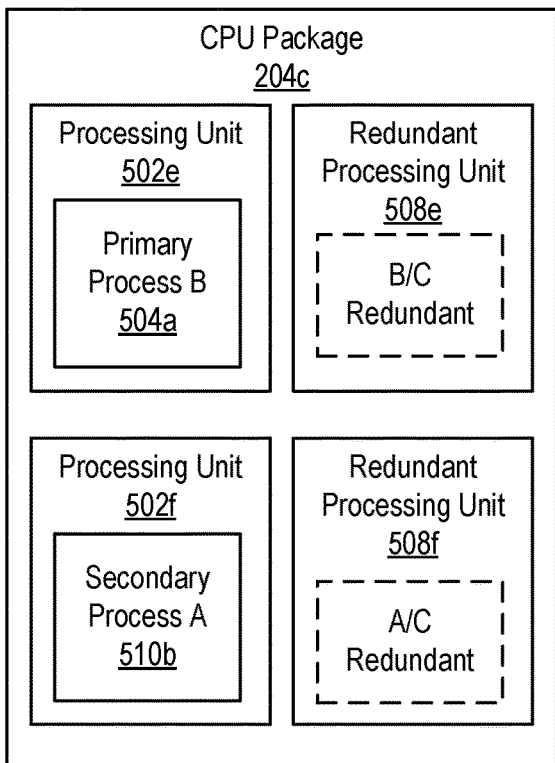

FIG. 5 is an example view of process allocation across CPU packages for process scheduling based on data arrival in an autonomous vehicle. Shown are three CPU packages

204a, 204b, and 204c. Each CPU package 204a includes a processing unit that has been allocated (e.g., by a hypervisor 228 or other process or service) primary execution of a process and another processing unit that has been allocated secondary execution of a process. As set forth herein, primary execution of a process describes an executing instance of a process whose output will be provided to another process or service. Secondary execution of the process describes executing an instance of the process in parallel to the primary execution, but the output may not be output to the other process or service. For example, in CPU package 204a, processing unit 502a has been allocated secondary execution of "process B," denoted as secondary process B 504b, while processing unit 502b has been allocated primary execution of "process C," denoted as primary process C 506a.

CPU package 204a also comprises two redundant processing units that are not actively executing a process A, B, or C, but are instead reserved in case of failure of an active processing unit. Redundant processing unit 508a has been reserved as "A/B redundant," indicating that reserved processing unit 508a may be allocated primary or secondary execution of processes A or B in the event of a failure of a processing unit allocated the primary or secondary execution of these processes. Redundant processing unit 508b has been reserved as "A/C redundant," indicating that reserved processing unit 508b may be allocated primary or secondary execution of processes A or C in the event of a failure of a processing unit allocated the primary or secondary execution of these processes.

CPU package 204b includes processing unit 502c, which has been allocated primary execution of "process A," denoted as primary process A 510a, and processing unit 502d, which has been allocated secondary execution of "process C," denoted as secondary process C 506a. CPU package 204b also includes redundant processing unit 508c, reserved as "A/B redundant," and redundant processing unit 508d, reserved as "B/C redundant." CPU package 204c includes processing unit 502e, which has been allocated primary execution of "process B," denoted as primary process B 504a, and processing unit 502f, which has been allocated secondary execution of "process A," denoted as secondary process A 510b. CPU package 204c also includes redundant processing unit 508e, reserved as "B/C redundant," and redundant processing unit 508f, reserved as "A/C redundant."

As set forth in the example view of FIG. 5, primary and secondary instances processes A, B, and C are each executed in an allocated processing unit. Thus, if a processing unit performing primary execution of a given process fails, the processing unit performing secondary execution may instead provide output of the given process to a receiving process or service. Moreover, the primary and secondary execution of a given process are executed on different CPU packages. Thus, if an entire processing unit fails, execution of each of the processes can continue using one or more processing units handling secondary execution. The redundant processing units 508a-f allow for allocation of primary or secondary execution of a process in the event of processing unit failure. This further prevents errors caused by processing unit failure as parallel primary and secondary execution of a process may be restored. One skilled in the art would understand that the number of CPU packages, processing units, redundant processing units, and processes may be modified according to performance requirements while maintaining redundancy.

Figure 6:
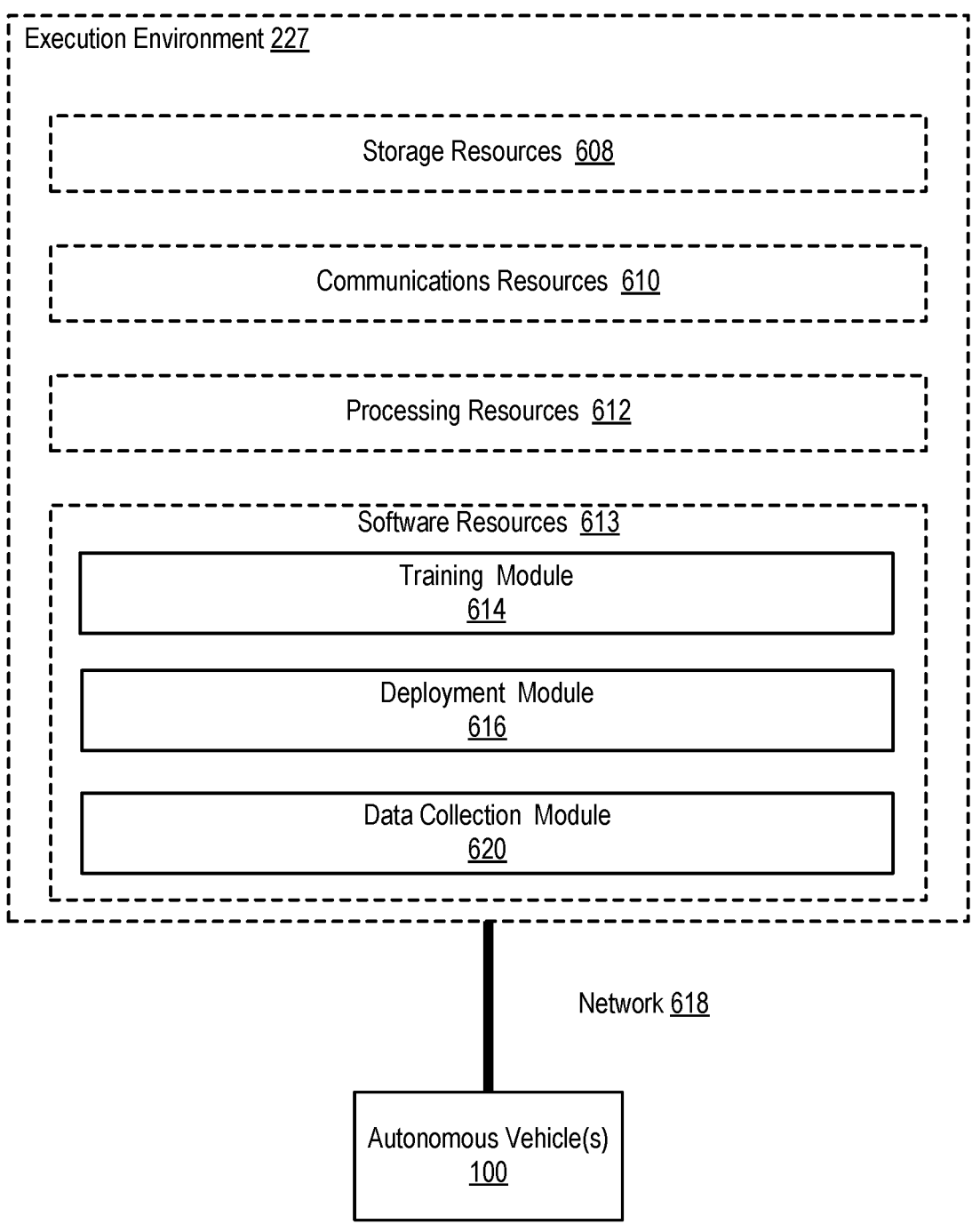
FIG. 6 is an example view of an execution environment for process scheduling based on data arrival in an autonomous vehicle according to some embodiments of the present disclosure.

For further explanation, FIG. 6 sets forth a diagram of an execution environment 227 accordance with some embodiments of the present disclosure. The execution environment 227 depicted in FIG. 6 may be embodied in a variety of different ways. The execution environment 227 may be provided, for example, by one or more physical or virtual machine components consisting of bare-metal applications, operating systems such as Android, Linux, Real-time Operating systems (RTOS), Automotive RTOS, such as AutoSAR, and others, including combinations thereof. The execution environment 227 may also be provided by cloud computing providers such as Amazon AWS, Microsoft Azure, Google Cloud, and others, including combinations thereof. Alternatively, the execution environment 227 may be embodied as a collection of devices (e.g., servers, storage devices, networking devices) and software resources that are included in a computer or distributed computer or private data center. Readers will appreciate that the execution environment 227 may be constructed in a variety of other ways and may even include resources within one or more autonomous vehicles or resources that communicate with one or more autonomous vehicles.

The execution environment 227 depicted in FIG. 6 may include storage resources 608, which may be embodied in many forms. For example, the storage resources 608 may include flash memory, hard disk drives, nano-RAM, 3D crosspoint non-volatile memory, MRAM, non-volatile phase-change memory ('PCM'), storage class memory ('SCM'), or many others, including combinations of the storage technologies described above. Readers will appreciate that other forms of computer memories and storage devices may be utilized as part of the execution environment 227, including DRAM, SRAM, EEPROM, universal memory, and many others. The storage resources 608 may also be embodied, in embodiments where the execution environment 227 includes resources offered by a cloud provider, as cloud storage resources such as Amazon Elastic Block Storage ('EBS') block storage, Amazon S3 object storage, Amazon Elastic File System ('EFS') file storage, Azure Blob Storage, and many others. The example execution environment 227 depicted in FIG. 6 may implement a variety of storage architectures, such as block storage where data is stored in blocks, and each block essentially acts as an individual hard drive, object storage where data is managed as objects, or file storage in which data is stored in a hierarchical structure. Such data may be saved in files and folders, and presented to both the system storing it and the system retrieving it in the same format.

The execution environment 227 depicted in FIG. 6 also includes communications resources 610 that may be useful in facilitating data communications between components within the execution environment 227, as well as data communications between the execution environment 227 and computing devices that are outside of the execution environment 227. Such communications resources may be embodied, for example, as one or more routers, network switches, communications adapters, and many others, including combinations of such devices. The communications resources 610 may be configured to utilize a variety of different protocols and data communication fabrics to facilitate data communications. For example, the communications resources 610 may utilize Internet Protocol ('IP') based technologies, fibre channel ('FC') technologies, FC over ethernet ('FCoE') technologies, InfiniBand ('IB') technologies, NVM Express ('NVMe') technologies and NVMe over fabrics ('NVMeoF') technologies, and many others. The communications resources 610 may also be embodied, in embodiments where the execution environment 227 includes resources offered by a cloud provider, as networking tools and resources that enable secure connections to the cloud as well as tools and resources (e.g., network interfaces, routing tables, gateways) to conFIG. networking resources in a virtual private cloud. Such communications resources may be useful in facilitating data communications between components within the execution environment 227, as well as data communications between the execution environment 227 and computing devices that are outside of the execution environment 227 (e.g., computing devices that are included within an autonomous vehicle).

The execution environment 227 depicted in FIG. 6 also includes processing resources 612 that may be useful in useful in executing computer program instructions and performing other computational tasks within the execution environment 227. The processing resources 612 may include one or more application-specific integrated circuits ('ASICs') that are customized for some particular purpose, one or more central processing units ('CPUs'), one or more digital signal processors ('DSPs'), one or more field-programmable gate arrays ('FPGAs'), one or more systems on a chip ('SoCs'), or other form of processing resources 612. The processing resources 612 may also be embodied, in embodiments where the execution environment 227 includes resources offered by a cloud provider, as cloud computing resources such as one or more Amazon Elastic Compute Cloud ('EC2') instances, event-driven compute resources such as AWS Lambdas, Azure Virtual Machines, or many others.

The execution environment 227 depicted in FIG. 6 also includes software resources 613 that, when executed by processing resources 612 within the execution environment 227, may perform various tasks. The software resources 613 may include, for example, one or more modules of computer program instructions that when executed by processing resources 612 within the execution environment 227 are useful in training neural networks configured to determine control autonomous vehicle control operations. For example, a training module 614 may train a neural network using training data including sensor 212 data and control operations recorded or captured contemporaneous to the training data. In other words, the neural network may be trained to encode a relationship between an environment relative to an autonomous vehicle 100 as indicated in sensor 212 data and the corresponding control operations effected by a user or operation of the autonomous vehicle. The training module 614 may provide a corpus of training data, or a selected subset of training data, to train the neural network. For example, the training module 614 may select particular subsets of training data associated with particular driving conditions, environment states, etc. to train the neural network.

The software resources 613 may include, for example, one or more modules of computer program instructions that when executed by processing resources 612 within the execution environment 227 are useful in deploying software resources or other data to autonomous vehicles 100 via a network 618. For example, a deployment module 616 may provide software updates, neural network updates, or other data to autonomous vehicles 100 to facilitate autonomous vehicle control operations.

The software resources 613 may include, for example, one or more modules of computer program instructions that when executed by processing resources 612 within the execution environment 227 are useful in collecting data from autonomous vehicles 100 via a network 618. For example, a data collection module 620 may receive, from autonomous vehicles 100, collected sensor 212, associated control operations, software performance logs, or other data. Such data may facilitate training of neural networks via the training module 614 or stored using storage resources 608.

Figure 7:
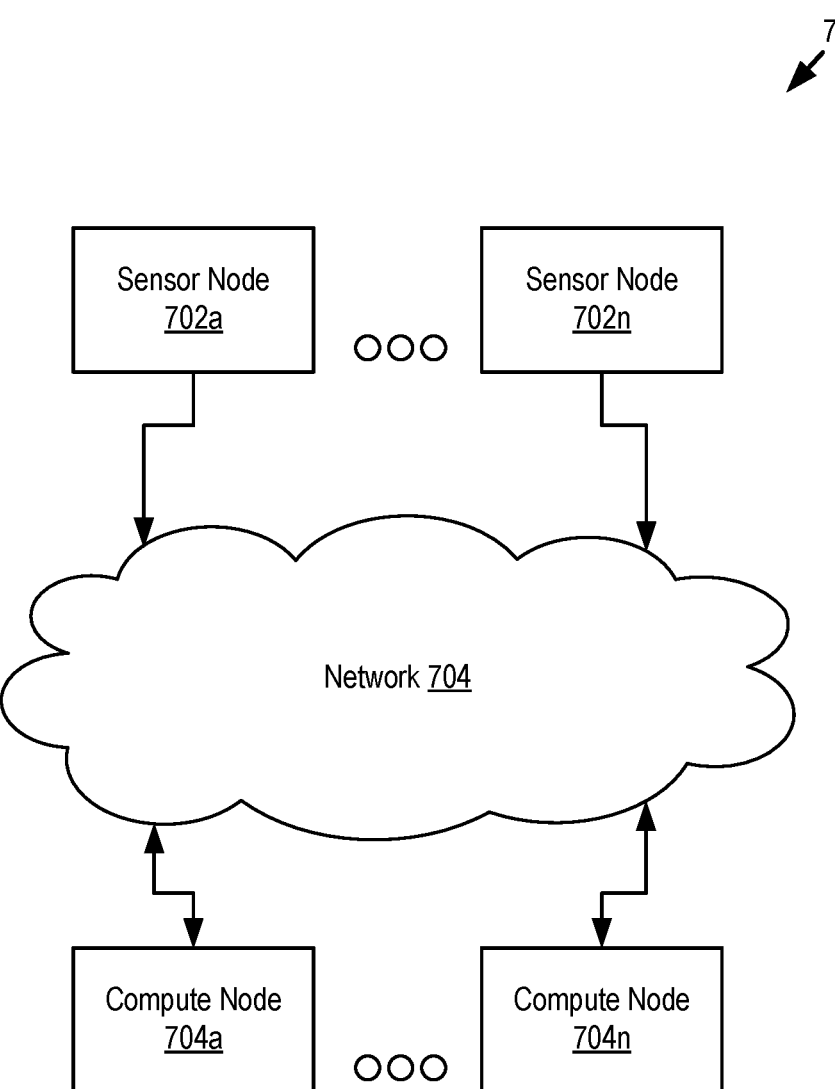
FIG. 7 is an example view of a distributed automation computing system for process scheduling based on data arrival in an autonomous vehicle according to some embodiments of the present disclosure.

FIG. 7 sets forth an example distributed automation computing system 700 of an autonomous vehicle 100 according to some embodiments of the present disclosure. The distributed automation computing system 700 includes various interconnected nodes that correspond to components of both an automation computing system 116 and sensors 212. The distributed automation computing system 700 also includes the various communications pathways interconnecting these nodes.

The distributed automation computing system 700 includes one or more sensor nodes 702*a-n*. Each sensor node 702*a-n* corresponds to a particular sensor 212 of an autonomous vehicle 100. For example, each sensor node 702*a-n* may include a camera, a radar sensor, a GPS sensor, a lidar sensor, or other sensors as can be appreciated. The distributed automation computing system 700 also includes one or more compute nodes 704*a-n*. Each compute node 704*a-n* is a physical or logical subdivision or grouping of physical computing resources. As an example, each compute node 704*a-n* may include a particular CPU package, system-on-a-chip (SOC), or other computing device or apparatus. As another example, each compute node 704*a-n* may include a particular core or processor of a multi-core or multi-processor system. Accordingly, each compute node 704*a-n* is capable of independently performing some computing operation, such as executing a particular program, thread, model, process, and the like.

The distributed automation computing system 700 also includes a network 704. The network 704 includes communications pathways and resources that interconnect the sensor nodes 704*a-n* and compute nodes 704*a-n*. As an example, the network 704 includes wired or wireless network components and pathways, switched fabrics, system busses or interconnects, or other data communications resources as can be appreciated.

In some embodiments, the network 704 is configured with predefined pathways between particular sensor nodes 702*a-n* and compute nodes 704*a-n*, as well as between compute nodes 704*a-n*, based on particular necessary execution or processing dependencies. In other embodiments, the network 704 is dynamically configurable or routable such that any sensor node 702*a-n* may communicate with any compute node 704*a-n* and such that any compute node 704*a-n* may communicate with any other compute node 704*a-n*.

In some embodiments, each compute node 704*a-n* is synchronized to a same clock to facilitate hard or soft real-time system implementations. In some embodiments, each sensor node 704*a-n* is also synchronized to the same clock. In some embodiments, the distributed automation computing system 700 is implemented as a hard real-time system whereby particular operations must be performed by the sensor nodes 702*a-n* and compute nodes 704*a-n* within defined time constraints (e.g., particular time windows, particular deadlines per operation, and the like). As an example, a sensor node 702*a-n* may be required to deliver sensor data at a particular interval. As another example, a compute node 704*a-n* may be required to process received data (e.g., sensor data or data output from another compute node 704*a-n*) by a particular deadline. Where a particular operation is not performed within the requisite time constraint, a system failure may occur. For example, the distributed automation computing system 700 may be disabled such that autonomous driving functions are disabled.

In other embodiments, as will be described in further detail below, the distributed automation computing system 700 is implemented using a soft real-time system. As a soft real-time system, particular operations are targeted to be performed within particular time constraints as with a hard real-time system. However, unlike a hard real-time system, a failure to perform a particular operation within a time constraint does not cause the distributed automation computing system 700 to enter a failure state. As an example, the distributed automation computing system 700 may implement a degraded performance mode in order to allow the distributed automation computing system 700 to continue operating if an operation fails to meet a time constraint.

Figure 8:
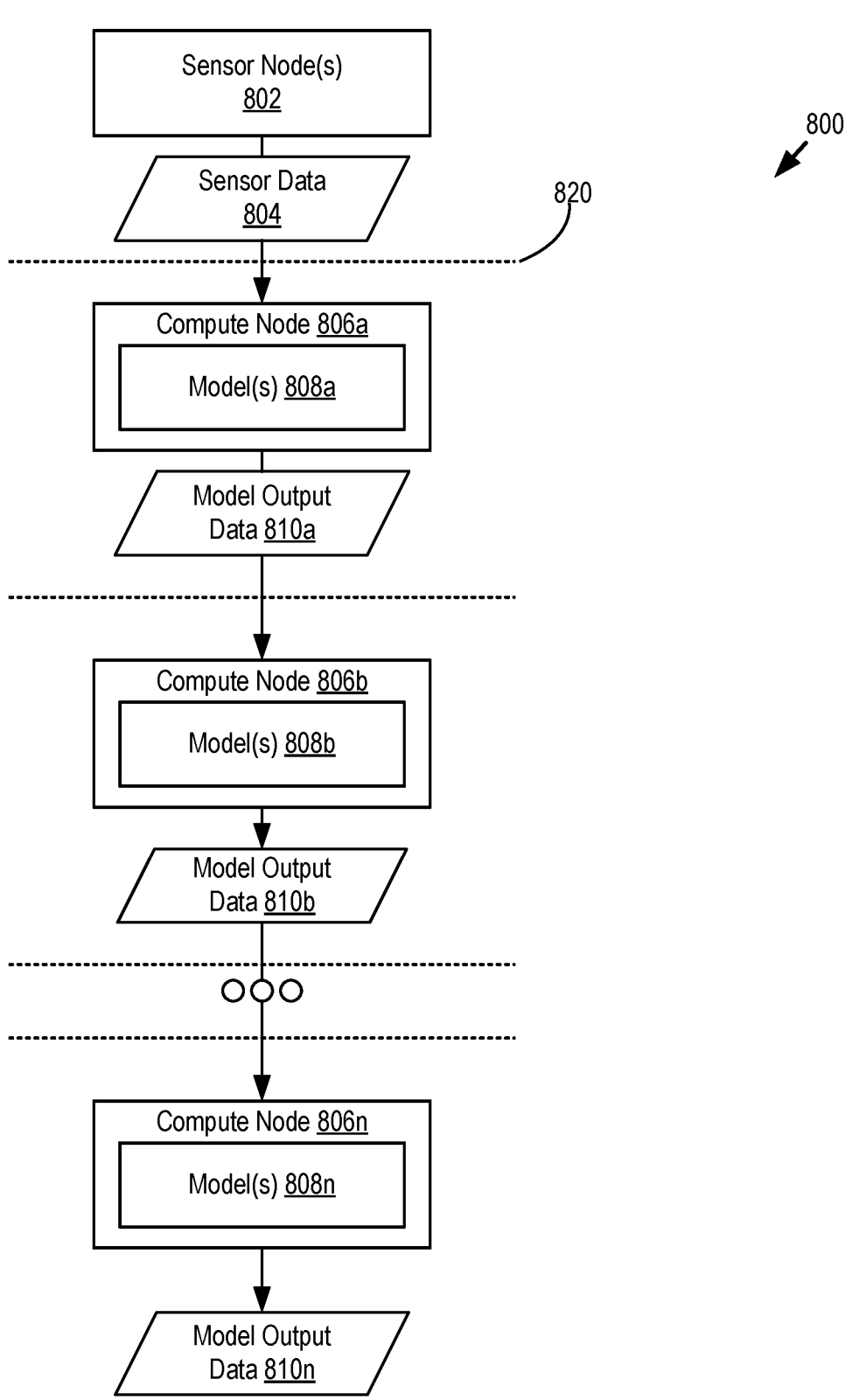
FIG. 8 is an example process flow in an execution environment for process scheduling based on data arrival in an autonomous vehicle according to some embodiments of the present disclosure.

FIG. 8 shows an example process flow 800 in a distributed automation computing system 700. The example data process 800 depicts a linear process flow 800 in the distributed automation computing system 700. One skilled in the art will appreciate that the use of a linear process flow 800 is merely illustrative and used for simplicity, and that in some embodiments, each node a distributed automation computing system 700 may receive inputs from potentially many nodes and may also provide outputs to potentially many nodes. Moreover, one skilled in the art will appreciate that the distributed automation computing system 700 may implement acyclic or cyclic data paths, or combinations thereof, depending on particular design considerations and data processing requirements and dependencies.

The example process flow 800 shows one or more sensor nodes 802 providing sensor data 804 to a compute node 806*a*. The input sensor data 804 is then processed by the compute node 806*a* using a particular model 808*a* to generate model output data 810*a*. This model output data 810*a* is then provided to a compute node 806*b*. The compute node 806*b* then processes the received model output data 810*a* (and potentially other data from other nodes) using a model 808*b* to generate model output data 810*b*. This dependent and processing of data by compute nodes 806*a,b-n* continues until the compute node 806*n* processes some amount of received data using a particular model 808*n* to generate model output data 810*n*.

The example process flow 800 corresponds to a soft real-time system whereby each node (e.g., sensor node 802 and compute node 806*a,b-n*) performs particular operations within a target time constraint. For example, in some embodiments, the time constraint includes a time window of a recurring interval. In some embodiments, the time window corresponds to a pipeline time window. For example, each compute node 806*a-n* is configured to perform some particular stage of a pipeline, and thereby perform amount of computation (e.g., processing some amount of input data, generating some amount of output data) within each iteration of the pipeline time window. In this example process flow 800, the various pipeline time windows are demarked using lines 820.

In some embodiments, during a given pipeline time window, a compute node 806*a-n* may be configured to process various portions of received input data. The various portions of input data may be received from different sources, or may arrive at separate times from a same source. Each portion of received input data may be processed using a particular process. For example, a particular thread or a particular model 808*a,b-n* (which may be executed by a particular thread) may be used to process each portion of input data. Accordingly, each compute node 806*a,b-n* may implement a process schedule defining an order at which a given process (e.g., a given model 808a,b-n) is executed to process a given portion of input data.

In a hard real-time system, the ordering in a process schedule is based priorities for given processes and time values associated with processing a given portion of data (e.g., a completion deadline, a computation time). In contrast, in some embodiments, the soft real-time system processes input data as it is received. In other words, a process for ordering a particular portion of input data is added to the process schedule in response to the input data being received. Thus, the ordering of the process schedule for a given compute node 806a,b-n is dependent on an order of receipt for the input data.

As the process schedule identifies a particular process or model to process the input data, the particular process or model is determined based on various heuristics. As an example, in some embodiments, the particular process is determined based on a type of data that is received. As another example, in some embodiments, the particular process is determined based on a failure to receive some portion of the input data. This will be described in further detail below in the context of a degraded operating mode.

In some embodiments, the particular process is based on an estimated processing time for the input data. For example, assume each process or model has a known or estimated processing time for input data determined a priori. In this example, multiple models 808a,b-n may be used to process a given portion of input data, with each model 808a,b-n having a different estimated processing time. For example, models 808a,b-n with higher estimated processing time may produce higher quality output, output with reduced errors or noise, outputs with higher confidence values, and the like when compared to those with lower processing times.

Accordingly, assuming that multiple processes must be executed within a given time window, the process or model 808a,b-n for a given portion of input data may be selected in order to maximize an amount of processing time performed within the time window (e.g., to maximize processor utilization) while preferentially processing all received portions of input data. As another example, in order to process all portions of received input data within the time window, a process or model 808a,b-n may be selected with a reduced estimated processing time in order to fit within the time window.

Where a particular time constraint is not satisfied for a particular operation, or if a particular operation is anticipatorily determined to be incapable of being performed within a time constraint, one or more of the nodes may enter a degraded performance mode to accommodate for the failure. As an example, assume that a particular compute node 806a,b-n expects to receive input (e.g., sensor data 804a or model output data 810a,b-n) at a particular interval. Where a source of that input fails to provide the input by the time the interval occurs, either due to a failure in the source node or in the communications pathway to the receiving compute node 806a,b-n, the compute node 806a,b-n may then enter a degraded performance mode to account for the missing input.

While in a degraded performance mode, a compute node 806a,b-n may select a model 808a,b-n for processing what input data was received, if any, in order to be able to provide an output to those compute nodes 806a,b-n depending on its output. In other words, a model 808a,b-n may be selected from a plurality of models 808a,b-n depending on the nature of the failure. Such output may have reduced confidence scores or increased error values, but allows compute nodes 806a,b-n depending on the output to perform their operations.

For example, assume that a compute node 806a is configured to process sensor data at each interval of a pipeline time window. Accordingly, the compute node 806a must receive sensor data from sensor nodes 802 at every interval. In this example, assume that the compute node 806a expects to receive image data from two camera sensors in order to perform some operation based on stereoscopic image data, such as depth estimation.

Where the compute node 806a receives the image data from both cameras, the compute node 806a may process the received image data using a model 808a trained to perform depth estimation using stereoscopic image data. Where the compute node 806a receives image data from one camera but not another, the compute node 806a may process the received image data using a model 808a trained to perform depth estimation using a single image and one or more motion vectors (e.g., based on previous image data from one or both cameras). Where the compute node 806a fails to receive any image data, the compute node 806a may use a model 808a that generates extrapolated or predicted images from previous image data and calculates depth estimation using the extrapolated images. Thus, each model 808a may generate a same type of output (e.g., a depth estimation) from different types or amounts of input data (e.g., stereoscopic image data, a single image and motion vectors, past image data, and the like). The output of each model 808a may include confidence scores or error values depending on the particular failure, allowing the calculations of downstream compute nodes 806b-n to account for the failure while still allowing system performance to continue.

In some embodiments, where a compute node 806a,b-n has entered a degraded performance mode due to a failure to meet a particular time constraint (e.g., a failure to receive input within a particular time constraint, a failure to generate output within a time constraint), the compute nodes 806a, b-n may perform various catch up operations in subsequent time windows (e.g., subsequent iterations of a pipeline time window). For example, assuming that some portion of input data was received after the end of a particular deadline such that it could not be processed within a particular pipeline time window, in some embodiments the late input data may be processed in a next pipeline time window. Accordingly, the particular process schedule for the compute node 806a, b-n may be adjusted so that the late input data may be processed along with performing the other requisite functionality for that pipeline time window. For example, particular models 808a,b-n may be selected for particular operations that have reduced expected processing times in order to allow the additional processing of the late input data. As another example, in some embodiments, the pipeline time window across all compute nodes 806a,b-n may be temporarily increased to allow for delayed or overdue processes to be performed. The pipeline time window may then be reduced back to an original value when it is determined that each compute node 808a,b-n is satisfying all time constraints within the extended pipeline time window, indicating that there is no additional catching up or late data to process. One skilled in the art will appreciate that these features for adjusting to and recovering from various degraded performance modes are unavailable in existing solutions for autonomous vehicles that require hard real-time systems where a failure to meet a particular time constraint or deadline would result in system failure.

Figure 9:
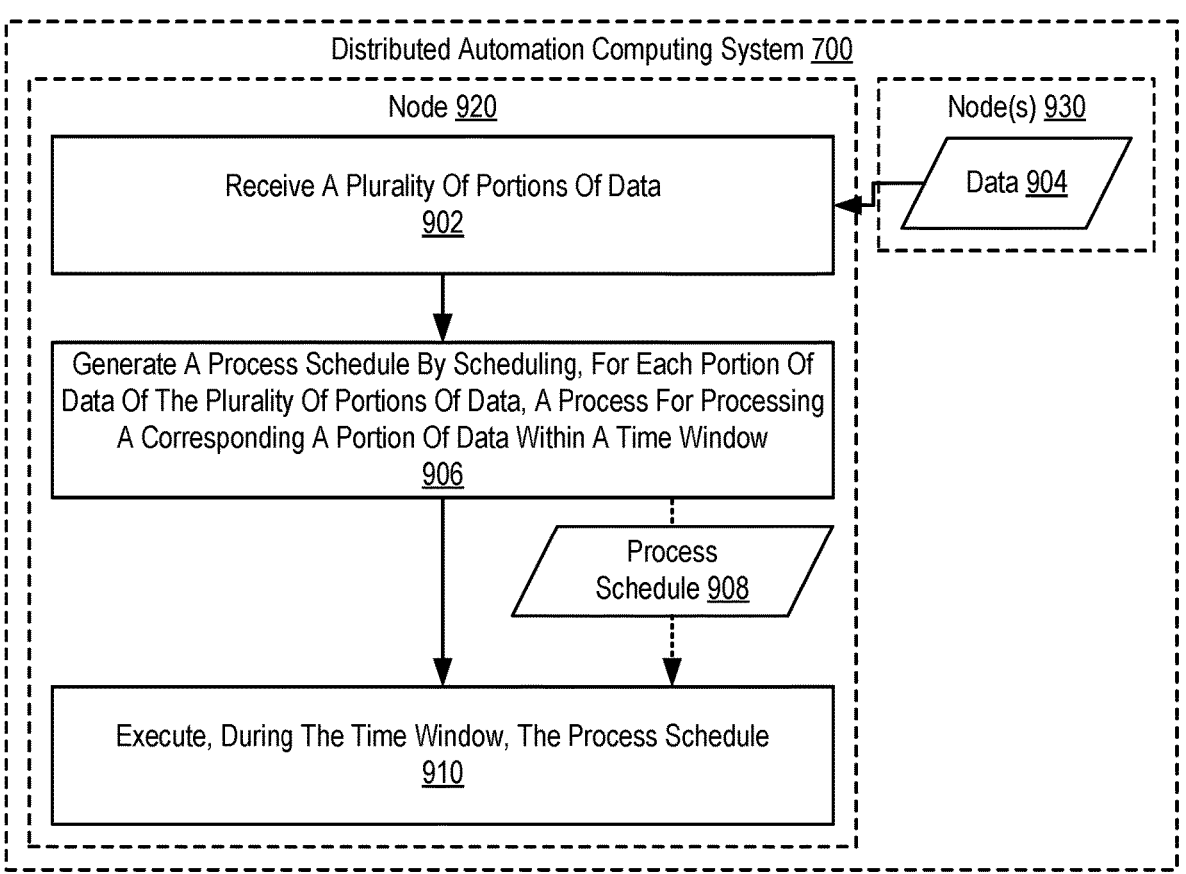
FIG. 9 is a flowchart of an example method for process scheduling based on data arrival in an autonomous vehicle according to some embodiments of the present disclosure.

For further explanation, FIG. 9 sets forth a flow chart illustrating an exemplary method for process scheduling based on data arrival according to some embodiments of the present disclosure. The method of FIG. 9 may be implemented, for example, in a distributed automation computing system 700 such as that as is depicted in FIG. 7. The method of FIG. 9 includes receiving 902 (e.g., by a node 920 from one or more other nodes 930) a plurality of portions of data 904. The node 920 may include, for example, a compute node 704a-n of FIG. 7, a compute node 806a,b-n of FIG. 8, and the like. The one or more other nodes 930 may include, for example, one or more sensor nodes 702a-n or compute nodes 704a-n of FIG. 7, one or more sensor nodes 802 or compute nodes 806a,b-n of FIG. 8, or combinations thereof. Accordingly, the data 904 may include sensor data 804, model output data 810a-n or other data output by compute nodes 704a-n, 706a,b-n, or combinations thereof.

In some embodiments, each portion of the data 904 is received 902 by the node 902 from a same other node 930. For example, the other node 930 may be configured to perform various operations, process various inputs, and the like, and for each operation output a particular portion of data 904 to the node 920. In other embodiments, each portion of the data 904 is received 902 by the node 902 from multiple other nodes 930.

The method of FIG. 9 also includes generating 906 a process schedule 908 by scheduling, for each portion of data 904 of the plurality of portions of data 904, a process for processing a corresponding portion of data 904 within a time window. An ordering of the process schedule 908 corresponds to an order of arrival for the plurality of portions of data 904. For example, as each portion of data 904 is received, an entry is added to the process schedule 908 for execution during the time window. In contrast to solutions for hard real-time systems where the ordering of a process schedule is based on time values or attributes associated with a particular process or received data (e.g., a shortest time to process, a soonest deadline, and the like), the ordering of the process schedule 908 is ordered according to the order of data 904 arrival.

In some embodiments, the time window corresponds to a pipeline time window whereby each node 920,930 is configured to iteratively perform some operation or operations within the pipeline time window, with the operations of a given node 920,930 being dependent on the processing of a parent node 920,930 during last pipeline time window. Unlike event-based scheduling where data is simply processed as it arrives, the distributed automation computing system 700 operates within particular time bounds and pipelining requirements of a soft real-time system.

Each entry for the process schedule 908 defines an order in which a particular portion of data 904 is to be processed by virtue of executing a particular process indicated in the process schedule 908. In some embodiments, particular portions of data 904 are configured to be performed by a predefined or default process. In some embodiments, as will be described in further detail below, a particular process is selected for processing a portion of data 904 based on various heuristics.

In some embodiments, the process added to the process schedule 908 for a given portion of data 904 corresponds to a particular model (e.g., a model 808a,b-n of FIG. 8). Thus, executing a particular process in the process schedule 908 causes execution of a particular model 808a,b-n, whereby the given portion of data 904 is provided as input to the model 808a,b-n to generate some output (e.g., model output data 810a,b-n). Where the process added to the process schedule 908 for a given portion of data 904 is selected from multiple processes, a particular model 808a,b-n is selected from multiple models 808a,b-n executable by the node 920.

The method of FIG. 9 also includes executing 910 (e.g., by the node 920), during the time window, the process schedule 908. In some embodiments, executing 910 the process schedule 908 includes executing a particular process (e.g., a particular model 808a,b-n) applied to a particular portion of data 904 according to an ordering in the process schedule 908. As an example, executing a particular process may include starting or resuming a particular thread corresponding to the process, executing a particular function or block of code associated with the process, providing the particular portion of data 904 as input to a particular model 808a,b-n, and the like.

The process schedule 908 is executed within the time window in that operations added to the process schedule 908 for execution in a particular time window (e.g., within a pipeline time window) or according to other time constraints or deadlines are executed within that particular time window. Thus, the distributed automation computing system 700 maintains soft real-time functionality during execution of the process schedule 908.

In some embodiments, the plurality of portions of data 904 are received 902 and their entries added to the process schedule 908 during a particular pipeline time window for execution during a next pipeline time window. In other words, data 904 is received and their process schedule 908 entries added during window N, and these entries are executed during window N+1. In some embodiments, one or more portions of data 904 are received and their entries added to the process schedule 908 during a same pipeline time window in which they will be executed.

Figure 10:
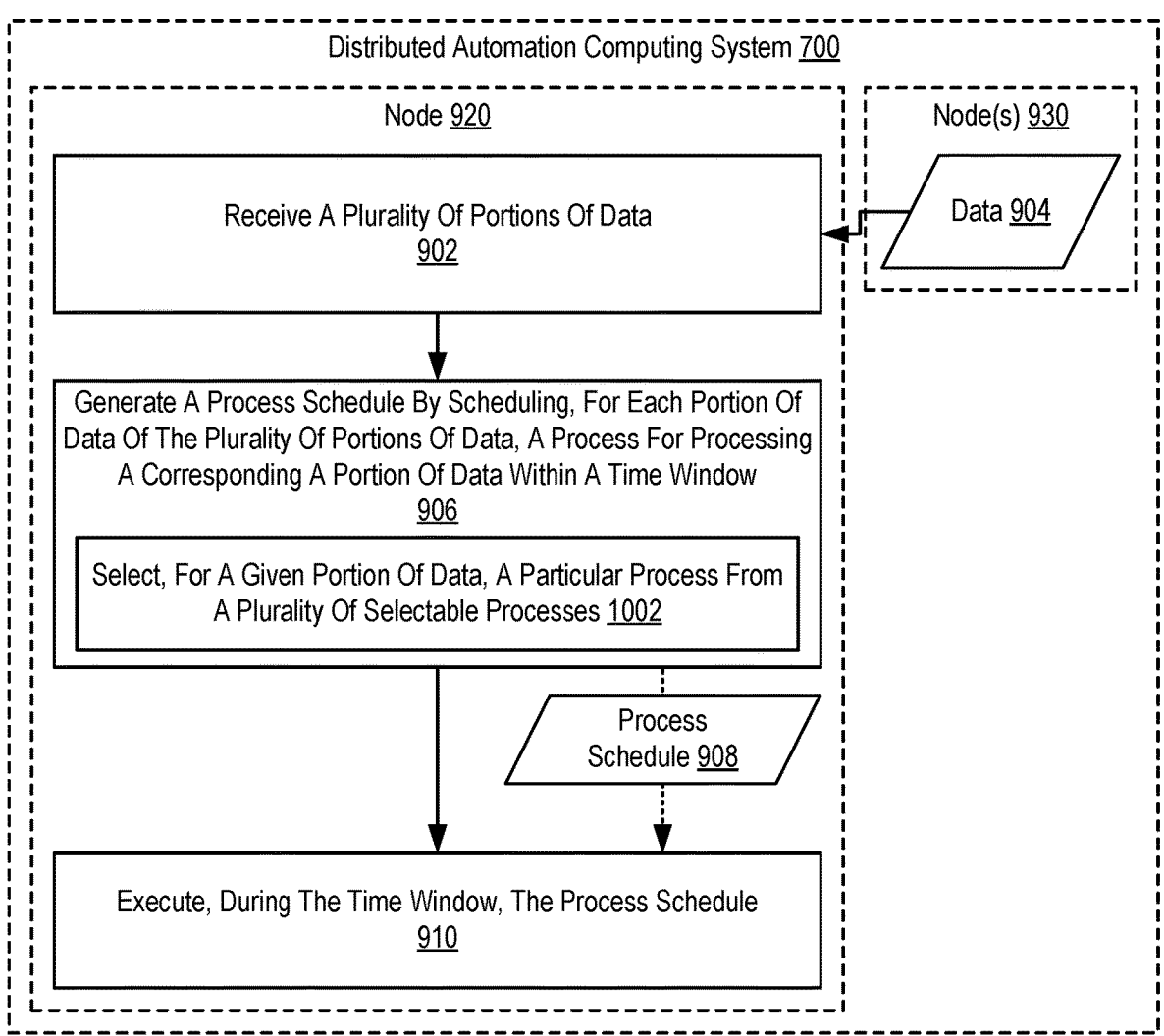
FIG. 10 is a flowchart of another example method for process scheduling based on data arrival in an autonomous vehicle according to some embodiments of the present disclosure.

For further explanation, FIG. 10 sets forth a flow chart illustrating another example method for process scheduling based on data arrival according to some embodiments of the present disclosure. The method of FIG. 10 is similar to FIG. 9 in that the method of FIG. 10 includes receiving 902 (e.g., by a node 920 from one or more other nodes 930) a plurality of portions of data 904; generating 906 a process schedule 908 by scheduling, for each portion of data 904 of the plurality of portions of data 904, a process for processing a corresponding portion of data 904 within a time window; and executing 910, during the time window, the process schedule 908.

The method of FIG. 10 differs from FIG. 9 in that generating 906 the process schedule 908 comprises selecting 1002, for a given portion of data 904, a particular process from a plurality of selectable processes. For example, a particular model 808a,b-n may be selected from a plurality of selectable models 804a,b-n. Although the following discussion will describe the selection of a particular model 804a,b-n, it is understood that the following discussion is applicable to other types of selectable processes, such as threads, blocks of code, functions, and the like.

The particular model 808a,b-n may be selected based on a type of data 904 received. In other words, the one or more heuristics include a type of data 904 received. For example, assume that a node 930 is able to provide, to the receiving node 920, data 904 of various types or classifications. The different data types may differ based on particular attributes, including size, resolution, confidence or error scores, or other attributes as can be appreciated. The particular model 808a,b-n may then be selected based on the data type. As an example, one model 808a,b-n may be preferentially selected for processing data 904 with high confidence scores or low error scores, while another 808a,b-n may be preferentially selected for processing data 904 with low confidence scores or high error scores. As another example, one model 808a, b-n may be preferentially selected for processing high resolution or high fidelity data 904 while another model 808a,b-n may be preferentially selected for low resolution or low fidelity data 904.

As another example, the particular model 808a,b-n may be selected based on which portions of data 904 are received. In other words, the one or more heuristics include which portions of data 904 are received, or a failure to receive some portion of data 904. As an example, assume that the node 920 has different models 808a,b-n for processing a full expected received dataset, a partially received dataset, and an empty or null dataset (e.g., expected data 904 was not received at all). Accordingly, the particular model 808a,b-n may be selected based on what data 904, if any, was received. As will be described in further detail below, selection of a model 808a,b-n due to a partial or total failure to receive some portion of data 904 may cause the node 920 to enter a degraded performance mode. In some embodiments, which portions of data 904 are received or not received may also be considered a type of data as referenced above. For example, a type of data may include full expected data, partial expected data, an absence of expected data (e.g., null or empty data), and the like.

In some embodiments, each selectable model 808a,b-n may correspond to a particular estimated processing time indicating an estimated amount of time for the model 808a,b-n to process some amount of input data 904. In other words, the one or more heuristics include an estimated processing time for a model 808a,b-n. Accordingly, the particular model 808a,b-n may be selected based on the estimated processing times for the models 808a,b-n. As an example, assume that multiple portions of data 904 should be processed within a pipeline time window.

The models 808a,b-n for processing each portion of data 904 may be selected such that their combined estimated processing times do not exceed the total duration of the pipeline time window, or some other time threshold (e.g., the duration of the pipeline time window minus some offset). As another example, the models 808a,b-n for selecting each portion of data 904 may be selected in order to maximize the amount of processing time used (e.g., maximizing processor utilization) while falling below the pipeline time window duration or another time threshold.

Once a particular model 808a,b-n has been selected for processing the particular portion of data 904, an entry is added to the process schedule 908 to execute that model. One skilled in the art will appreciate that, in some embodiments, each model 808a,b-n may be selected for processing a single portion of received data 904 or for processing multiple portions of received data 904.

Although the above discussion describes an ordering of the process schedule 908 corresponding to an order in which the data 904 was received, in other embodiments the order of the process schedule 908 is also based on the one or more heuristics described above. As another example, in some embodiments, a particular process (e.g., a particular model 808a,b-n) is selected from the selectable processes based on the order in which the portion of data 904 to be processed is received.

Figure 11:
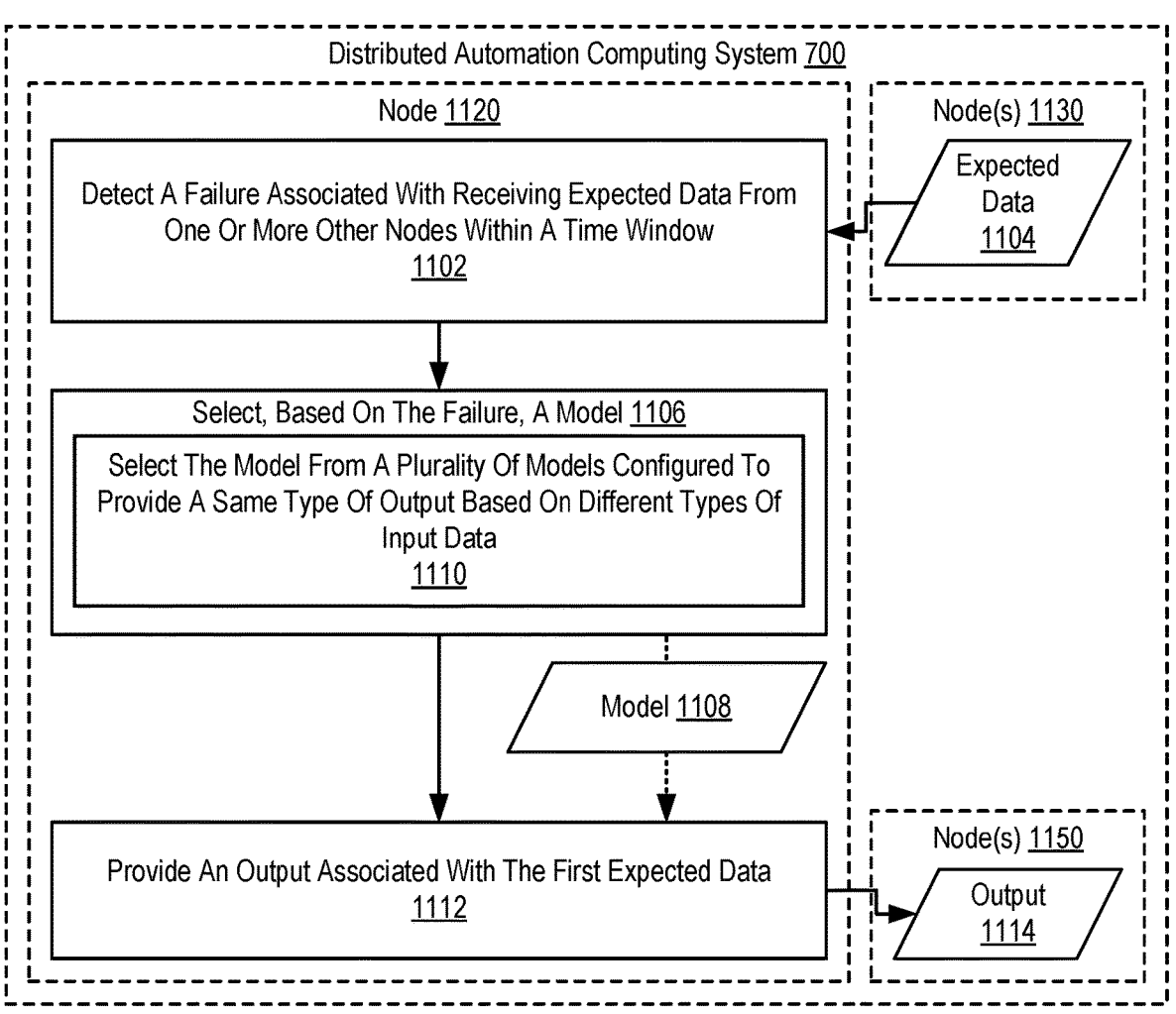
FIG. 11 is a flowchart of an example method for implementing degrade performance modes in an autonomous vehicle according to some embodiments of the present disclosure.

For further explanation, FIG. 11 sets forth a flow chart illustrating an exemplary method for implementing degraded performance modes in an autonomous vehicle according to some embodiments of the present disclosure. The method of FIG. 11 may be implemented, for example, in a distributed automation computing system 700 such as that as is depicted in FIG. 7. The method of FIG. 11 includes detecting 1102 (e.g., by a node 1120) a failure associated with receiving first expected data (shown as expected data 1104) from one or more other nodes 1130. The node 1120 may include, for example, a compute node 704a-n of FIG. 7, a compute node 806a,b-n of FIG. 8, and the like. The one or more other nodes 1130 may include, for example, one or more sensor nodes 702a-n or compute nodes 704a-n of FIG. 7, one or more sensor nodes 802 or compute nodes 806a,b-n of FIG. 8, or combinations thereof. Accordingly, the expected data 1104 may include sensor data 804, model output data 810a-n or other data output by compute nodes 704a-n, 706a,b-n, or combinations thereof.

The expected data 1104 includes some amount of data 1104 generated or provided by the one or more nodes 1130 that the node 1120 expects to receive according to some policy, rules, conditions, and the like. As an example, assume that the one or more other nodes 1130 are configured to provide the expected data 1104 to the node 1120 at a predefined interval, at some point during each of a recurring time window (e.g., a pipeline time window), or according to some other frequency or triggered condition.

Accordingly, in some embodiments, a failure to receive the expected data 1104 includes detecting that the time window (or potentially some other time constraint associated with receiving the expected data 1104) has passed with some portion of the expected data 1104 not being received. As an example, in some embodiments, detecting 1102 the failure includes detecting that no portion of the expected data 1104 was received. As another example, in some embodiments, detecting 1102 the failure includes detecting that a portion of the expected data 1104 was received while a another portion of the expected data 1104 was not received.

The method of FIG. 11 also includes selecting 1106, based on the failure, a model 1108 (e.g., a model 806a,b-n). The selected 1106 model 1108 is a model 1108 configured to process what portions of the expected data 1104 were received, if any. For example, a particular model 1108 may be selected for processing partial expected data 1104 where a portion, but not all, of the expected data 1104 was received. As another example, a particular model 1108 may be selected where no expected data 1104 is received to cause the failure. Such a model 1108 may be configured to generate predicted or extrapolated expected data 1104 based on previously received instances of expected data 1104 (e.g., received during previous time windows and the like). The extrapolated expected data 1104 may be used by the model 1108 or provided as input to another selected model 1108 to generate some output 1114 as will be described in further detail below.

In other words, selecting 1106, based on the failure 1108, a model 1108 includes selecting 1110 the model 1108 from a plurality of models 1108 configured to provide a same type of output based on different types of input. As will be described in further detail below, the selected 1106 model 1108 will be used to provide an output 1114 to one or more other nodes 1150 expecting some output from the node 1120. In other words, the output 1114 of the node 1120 is treated as expected data 1104 for the nodes 1150 configured to receive the output 1114. Accordingly, in order to ensure that he node 1150 and other downstream nodes continue to function, the node 1120 provides output 1114 in some expected format and according to some expected time constraints based on the different types of failures that may occur, should any occur.

The method of FIG. 11 also includes providing 1112 an output 1114 associated with the first expected data 1104. As is set forth above, the output 1114 is the result of providing what portions of the expected data 1104 are received, if any, to the selected model 1108. By providing output 1114 to the nodes 1150, the nodes 1150 and its related downstream nodes are able to function in the event of a data reception failure. This is in contrast to hard real-time systems where such a failure to receive expected data 1104 would cause a system failure. Instead, the distributed automation computing system 700 enters a degraded performance mode whereby different models 1108 are selected to provide output 1114 in the event of a failure.

Consider an example where a node 1120 is configured to receive image data from two cameras (e.g., two nodes 1130) at each instance of a pipeline time window. Further assume that the node 1120 is configured to provide a depth estimation for various objects identified in the image data to a downstream node 1150. During each pipeline stage of a normal performance mode, the node 1120 selects a model 1108 for generating a depth estimation based on stereoscopic image data received from the two cameras. Using the selected model 1108, the stereoscopic image data is processed using the model 1108 to generate a depth estimation included in an output 1114. The output 1114 is then provided to one or more downstream nodes 1150.

Continuing with this example, assume that a failure (e.g., in a camera or in a communications pathway from the camera to the node 1120) causes the node 1120 to only receive a single image from a single camera. The node 1120 is therefore unable to calculate the motion estimation using stereoscopic image data. Instead of causing a system failure as in a hard real-time system, the node 1120 enters a degraded performance mode and selects a model 1108 that calculates a depth estimation using a frame of image data (e.g., the received portion of expected data 1104) and one or more motion vectors (e.g., based on previously received image data). The depth estimation is then provided in the output 1114 to the downstream nodes 1150.

As another example using the node 1120 configured to perform depth estimation using stereoscopic image data, assume that a failure occurs such that no image data is provided to the node 1120. In other words, no expected data 1104 is received by the node 1120. The node 1120 selects 1108 a model for generating a depth estimation by generating extrapolated or predicted image data from previously received image data. The predicted image data may then be provided to another model 1108 to generate the depth estimation, or used within the same model 1108 as intermediate data for generating the depth estimation. The depth estimation is then indicated in the output 1114 provided to the downstream nodes 1150. These exemplary models 1108 provide a same type of output 1114 (e.g., a depth estimation) using different types of input data (e.g., full expected data 1104, partial expected data 1104, null expected data 1104, and the like.

One skilled in the art will appreciate the advantage of the approaches described herein as it allows a distributed automation computing system 700 to continue functioning in the event that a time constraint or deadline is not met, in contrast to hard real-time systems where such a failure would cause a system failure cascading to all downstream nodes. For example, particular regulatory requirements may dictate that autonomous vehicle must support degraded performance modes whereby the autonomous vehicle may continue to perform autonomous driving function in the event of some degree of operational failure.

Figure 12:
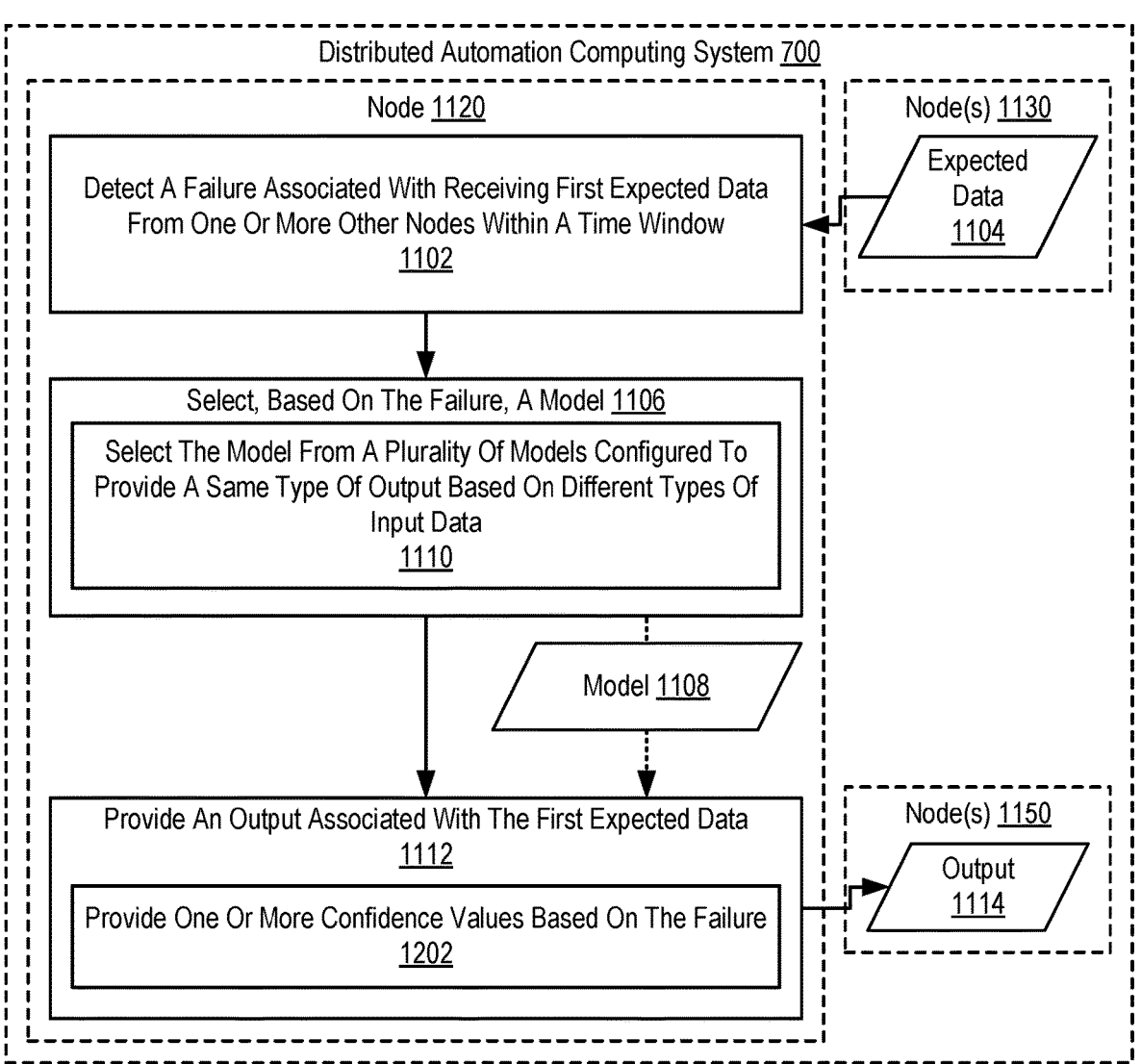
FIG. 12 is a flowchart of another example method for implementing degrade performance modes in an autonomous vehicle according to some embodiments of the present disclosure.

For further explanation, FIG. 12 sets forth a flow chart illustrating an exemplary method for implementing degraded performance modes in an autonomous vehicle according to some embodiments of the present disclosure. The method of FIG. 12 is similar to FIG. 11 in that the method of FIG. 12 includes detecting 1102 (e.g., by a node 1120) a failure associated with receiving first expected data (e.g., expected data 1104) from one or more other nodes 1130; selecting 1106, based on the failure, a model 1108 by selecting 1110 the model 1108 from a plurality of models 1108 configured to provide a same type of output based on different types of input data; and providing 1112 an output 1114 associated with the first expected data.

The method of FIG. 12 differs from FIG. 11 in that providing 1112 an output associated with the first expected data 1104 includes providing 1202 one or more confidence values based on the failure. For example, assume that each selectable model 1108 provides a particular confidence value (e.g., an error value) with their respective output 1114. The confidence value may be based on the particular model 1108 used to generate the particular output 1114. As the particular model 1108 is selected 1106 based on the failure, the particular confidence score is based on the failure.

As an example, the confidence value provided by a given model 1108 may be based on an amount or degree of expected data 1104 provided to the model 1108. For example, a model 1108 configured to provide a particular type of output 1114 based on a complete set of expected data 1104 (e.g., received without error) may provide a highest confidence value. A model 1108 configured to provide the particular type of output 1114 based on partially received expected data 1104 may provide a lower confidence value. A model 1108 configured to provide the particular type of output based on a null or empty set of expected data 1104 may provide a lowest confidence value. Continuing with the examples above, a model 1108 providing a depth estimation using stereoscopic image data may provide output 1114 with a highest confidence value. A model 1108 providing a depth estimation using a single image and motion vectors may provide output 1114 with a lower confidence value. A model 1108 providing a depth estimation by extrapolating image data from previously received input data may provide a lowest confidence value.

In some embodiments, the output 1114 of a model 1108 may include a single confidence value. In other embodiments, the output 1114 of a model 1108 may include multiple confidence values each corresponding to different values, objects, and the like in the output 1114. A receiving node 1150 may then provide the confidence values as input to their respective models on order to perform their respective operations. Thus, a failure detected by a node 1120 may affect the particular calculations or operations performed by downstream nodes 1150 by virtue of the confidence values factoring in their calculations, but without causing a cascading system failure as would be found in a hard real-time system.

Figure 13:
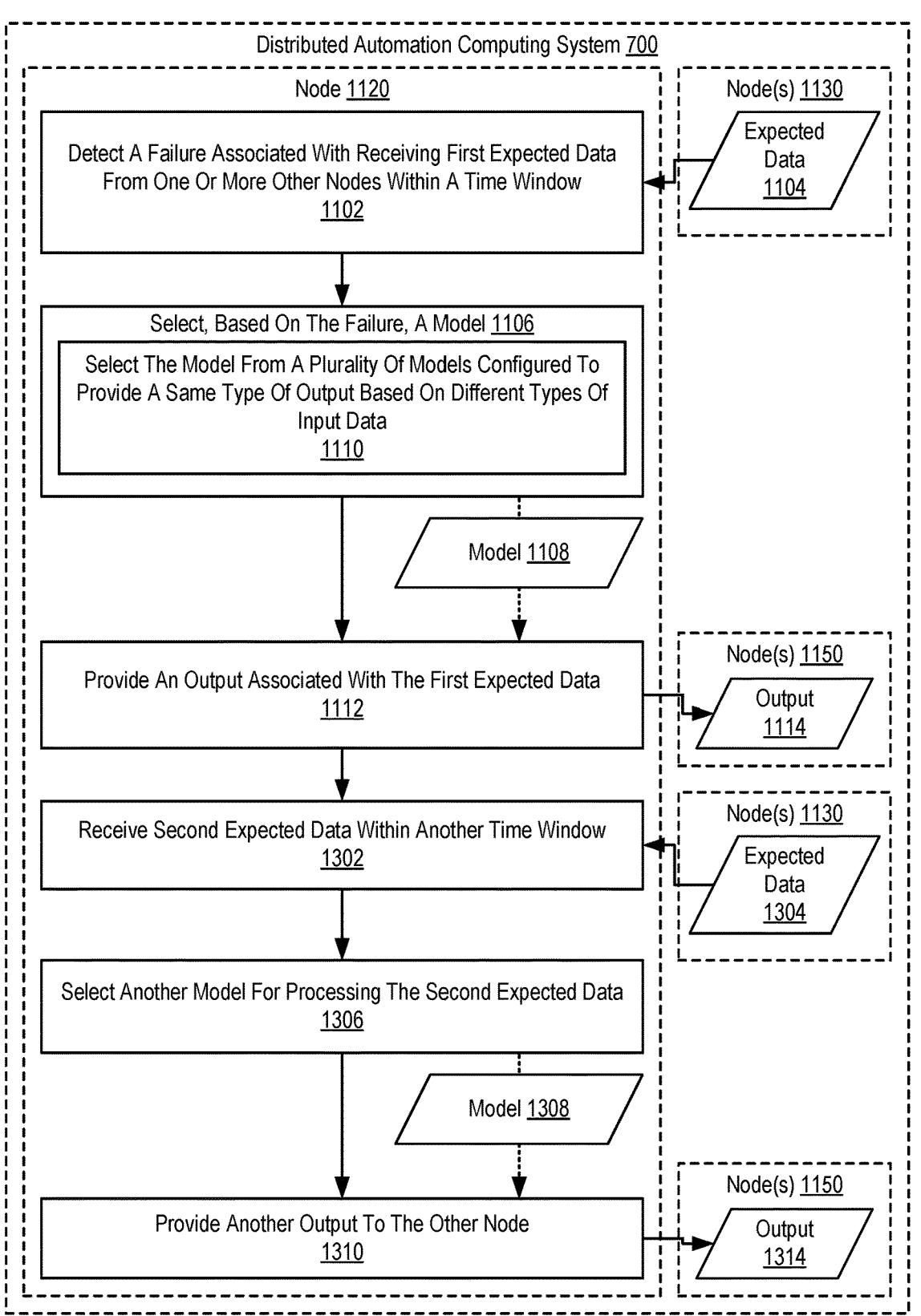
FIG. 13 is a flowchart of another example method for implementing degrade performance modes in an autonomous vehicle according to some embodiments of the present disclosure.

For further explanation, FIG. 13 sets forth a flow chart illustrating an exemplary method for implementing degraded performance modes in an autonomous vehicle according to some embodiments of the present disclosure. The method of FIG. 13 is similar to FIG. 11 in that the method of FIG. 13 includes detecting 1102 (e.g., by a node 1120) a failure associated with receiving first expected data (e.g., expected data 1104) from one or more other nodes 1130; selecting 1106, based on the failure, a model 1108 by selecting 1110 the model 1108 from a plurality of models 1108 configured to provide a same type of output based on different types of input data; and providing 1112 an output 1114 associated with the first expected data.

The method of FIG. 13 differs from FIG. 11 in that the method of FIG. 13 includes receiving 1302 (e.g., by the node 1120 from one or more other nodes 1130) second expected data (shown as expected data 1304) associated with another time window. The expected data 1304 is similar to the expected data 1104 except that no failure was detected in receiving 1302 the expected data 1304. That is, the entirety of the expected data 1304 was received. The other time window may correspond to a subsequent time window compared to the time window associated with the failed expected data 1104.

The method of FIG. 13 also includes selecting 1306 another model 1308 for processing the second expected data 1304. For example, the selected 1306 model 1308 may be configured to provide a full set of expected data 1304 received without failure. The method of FIG. 13 also includes providing 1310 another output 1314 to the other node 1150. The other output 1314 may include an output of the model 1308 with the received 1302 expected data 1304 provided as input to the model 1308. The output 1314 may include a confidence score higher than the output 1114 of the model 1108 by virtue of the output 1314 being generated based on a full set of expected data 1304. Thus, where a previously detected 1102 failure is resolved, the distributed automation computing system 700 may resume operation in a non-degrade state using models 1308 configured to operate on full expected data 1304.

Exemplary embodiments of the present invention are described largely in the context of a fully functional computer system for process scheduling based on data arrival in an autonomous vehicle. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood that any of the functionality or approaches set forth herein may be facilitated at least in part by artificial intelligence applications, including machine learning applications, big data analytics applications, deep learning, and other techniques. Applications of such techniques may include: machine and vehicular object detection, identification and avoidance; visual recognition, classification and tagging; algorithmic financial trading strategy performance management; simultaneous localization and mapping; predictive maintenance of high-value machinery; prevention against cyber security threats, expertise automation; image recognition and classification; question answering; robotics; text analytics (extraction, classification) and text generation and translation; and many others.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method comprising:

receiving, by a first compute node configured to process sensor data in an autonomous vehicle at each interval of a pipeline time window and from one or more sensor nodes of a distributed automation computing system, a first portion of sensor data in a first interval of the pipeline time window;

detecting, during the first interval of the pipeline time window, a first characteristic of the first portion of sensor data;

generating a process schedule by assigning a first model to process the first portion of sensor data within a time window, the first model selected from a plurality of models according to the first characteristic of the first portion of sensor data, wherein an ordering of the process schedule corresponds to an order of arrival of the first portion of sensor data within the sensor data;

detecting, during a second interval of the pipeline time window subsequent to the first interval of the pipeline time window, that a second portion of sensor data received during the second interval of the pipeline time window failed to arrive within a particular time constraint was received too late to be processed by the first model within the second interval of the pipeline time window;

adjusting the process schedule by assigning a second model to process the second portion of sensor data within a next interval immediately subsequent to the second interval of the pipeline time window, the second model selected from the plurality of models according to an ability of the second model to process the second portion of sensor data within a reduced processing time compared to a processing time of the first model;

executing, according to the ordering of the process schedule, the first model on the first portion of data and the second model on the second portion of data; and executing, using a result of executing the first model on the first portion of data and a second result of executing the second model on the second portion of data, a control operation of the autonomous vehicle .

2. A method comprising:

receiving, by a first compute node configured to process sensor data in an autonomous vehicle at each interval of a pipeline time window and from one or more sensor nodes of a distributed automation computing system, a first portion of sensor data in a first interval of the pipeline time window;

detecting, during the first interval of the pipeline time window, a first characteristic of the first portion of sensor data;

generating a process schedule by assigning a first model to process the first portion of sensor data within a time window, the first model selected from a plurality of models according to the first characteristic of the first portion of sensor data, wherein an ordering of the process schedule corresponds to an order of arrival of the first portion of sensor data within the sensor data;

detecting, during a second interval of the pipeline time window subsequent to the first interval of the pipeline time window, that a second portion of sensor data received during the second interval of the pipeline time window failed to arrive within a particular time constraint was received too late to be processed by the first model within the second interval of the pipeline time window;

adjusting the process schedule by assigning a second model to process the second portion of sensor data within a next interval immediately subsequent to the second interval of the pipeline time window, the second model selected from the plurality of models according to an ability of the second model to process the second portion of sensor data within a reduced processing time compared to a processing time of the first model;

executing, according to the ordering of the process schedule, the first model on the first portion of data and the second model on the second portion of data; and executing, using a result of executing the first model on the first portion of data and a second result of executing the second model on the second portion of data, a control operation of the autonomous vehicle.

3. A method comprising:

receiving, by a first compute node configured to process sensor data in an autonomous vehicle at each interval of a pipeline time window and from one or more sensor nodes of a distributed automation computing system, a first portion of sensor data in a first interval of the pipeline time window;

detecting, during the first interval of the pipeline time window, a first characteristic of the first portion of sensor data;

generating a process schedule by assigning a first model to process the first portion of sensor data within a time window, the first model selected from a plurality of models according to the first characteristic of the first portion of sensor data, wherein an ordering of the process schedule corresponds to an order of arrival of the first portion of sensor data within the sensor data;

detecting, during a second interval of the pipeline time window subsequent to the first interval of the pipeline time window, that a second portion of sensor data received during the second interval of the pipeline time window failed to arrive within a particular time constraint was received too late to be processed by the first model within the second interval of the pipeline time window;

adjusting the process schedule by assigning a second model to process the second portion of sensor data within a next interval immediately subsequent to the second interval of the pipeline time window, the second model selected from the plurality of models according to an ability of the second model to process the second portion of sensor data within a reduced processing time compared to a processing time of the first model;

executing, according to the ordering of the process schedule, the first model on the first portion of data and the second model on the second portion of data; and executing, using a result of executing the first model on the first portion of data and a second result of executing the second model on the second portion of data, a control operation of the autonomous vehicle.

4. The method of claim 1, wherein the first model is assigned to maximize an amount of processing time performed within the time window.

5. The method of claim 1, wherein the first model is assigned according to a processing time of the first portion of sensor data by the first model.

6. The method of claim 1, further comprising:

detecting an arrival time of the first portion of sensor data within the first interval of the pipeline time window.

7. The method of claim 6, wherein the first model is executed during the first interval of the pipeline time window.

8. The method of claim 6, wherein the first model is executed during a next interval immediately subsequent to the first interval of the pipeline time window.

9. The apparatus of claim 2, wherein the first model is assigned to maximize an amount of processing time performed within the time window.

10. The apparatus of claim 2, wherein the first model is assigned according to a processing time of the first portion of sensor data by the first model.

11. The apparatus of claim 2, wherein the computer program instructions, when executed by the computer processor, cause the apparatus to perform steps further comprising:

detecting an arrival time of the first portion of sensor data within the first interval of the pipeline time window.

12. The apparatus of claim 11, wherein the first model is executed during the first interval of the pipeline time window.

13. The apparatus of claim 11, wherein the first model is executed during a next interval immediately subsequent to the first interval of the pipeline time window.

14. The computer program product of claim 3, wherein the first model is assigned to maximize an amount of processing time performed within the time window.

15. The method of claim 1, further comprising:

detecting, during a third interval of the pipeline time window subsequent to the second interval of the pipeline time window, that a third portion of sensor data received during the third interval of the pipeline time window was received too late to be processed by the first model within the third interval of the pipeline time window, and extending, during the third interval of the pipeline time window, responsive to detecting that the third portion of sensor data was received too late, the pipeline time window to an extended pipeline time window, the extended pipeline time window allowing time for the first model to process the third portion of sensor data within the third interval.

16. The method of claim 15, further comprising:

detecting, during a fourth interval of the extended pipeline time window, that each compute node executing the first model is satisfying a time constraint; and reducing, responsive to detecting that each compute node executing the first model is satisfying the time constraint, the extended pipeline time window to the pipeline time window.

17. The apparatus of claim 2, wherein the computer program instructions, when executed by the computer processor, cause the apparatus to perform steps further comprising:

detecting, during a third interval of the pipeline time window subsequent to the second interval of the pipeline time window, that a third portion of sensor data received during the third interval of the pipeline time window was received too late to be processed by the first model within the third interval of the pipeline time window; and extending, during the third interval of the pipeline time window, responsive to detecting that the third portion of sensor data was received too late, the pipeline time window to an extended pipeline time window, the extended pipeline time window allowing time for the first model to process the third portion of sensor data within the third interval.

18. The apparatus of claim 17, wherein the computer program instructions, when executed, cause the computer system to perform steps further comprising:

detecting, during a fourth interval of the extended pipeline time window, that each compute node executing the first model is satisfying a time constraint; and reducing, responsive to detecting that each compute node executing the first model is satisfying the time constraint, the extended pipeline time window to the pipeline time window.

19. The computer program product of claim 3, wherein the computer program instructions, when executed, cause the computer system to perform steps further comprising:

detecting, during a third interval of the pipeline time window subsequent to the second interval of the pipeline time window, that a third portion of sensor data received during the third interval of the pipeline time window was received too late to be processed by the first model within the third interval of the pipeline time window; and extending, during the third interval of the pipeline time window, responsive to detecting that the third portion of sensor data was received too late, the pipeline time window to an extended pipeline time window, the extended pipeline time window allowing time for the first model to process the third portion of sensor data within the third interval.

20. The computer program product of claim 19, wherein the computer program instructions, when executed, cause the computer system to perform steps further comprising:

detecting, during a fourth interval of the extended pipeline time window, that each compute node executing the first model is satisfying a time constraint; and reducing, responsive to detecting that each compute node executing the first model is satisfying the time constraint, the extended pipeline time window to the pipeline time window.

\*    \*    \*    \*    \*